(12) United States Patent
Nakajima et al.

(10) Patent No.: US 10,404,178 B2
(45) Date of Patent: Sep. 3, 2019

(54) INSULATION TYPE STEP-UP CONVERTER

(71) Applicant: MITSUBISHI ELECTRIC CORPORATION, Chiyoda-ku, Tokyo (JP)

(72) Inventors: Koji Nakajima, Tokyo (JP); Takashi Kumagai, Tokyo (JP); Yuji Shirakata, Tokyo (JP); Yujiro Kido, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/093,421

(22) PCT Filed: Apr. 11, 2017

(86) PCT No.: PCT/JP2017/014805
§ 371 (c)(1),
(2) Date: Oct. 12, 2018

(87) PCT Pub. No.: WO2017/183518
PCT Pub. Date: Oct. 26, 2017

(65) Prior Publication Data
US 2019/0108937 A1    Apr. 11, 2019

(30) Foreign Application Priority Data

Apr. 21, 2016 (JP) .................. 2016-085462

(51) Int. Cl.
*H02M 3/335* (2006.01)
*H02M 3/28* (2006.01)
(Continued)

(52) U.S. Cl.
CPC .......... *H02M 3/3353* (2013.01); *H01F 27/24* (2013.01); *H01F 27/2804* (2013.01);
(Continued)

(58) Field of Classification Search
CPC ...................... H01F 27/24; H01F 2001/0064
See application file for complete search history.

(56) References Cited

U.S. PATENT DOCUMENTS

| 5,952,909 A | 9/1999 | Umeno et al. |
| 6,000,128 A | 12/1999 | Umeno et al. |

(Continued)

FOREIGN PATENT DOCUMENTS

| JP | H08069935 A | 3/1996 |
| JP | 2004303857 A | 10/2004 |

(Continued)

OTHER PUBLICATIONS

International Search Report (with English translation) and Written Opinion issued in International Patent Application No. PCT/JP2017/014805, 9 pages (dated Jun. 6, 2017).

*Primary Examiner* — Fred E Finch, III
*Assistant Examiner* — Ishrat F Jamali
(74) *Attorney, Agent, or Firm* — Buchanan Ingersoll & Rooney PC

(57) ABSTRACT

An insulation type step-up converter includes a core, first and second primary-side coils, a secondary-side coil, and a switching element. The core includes a middle leg, and first and second outer legs. The switching element is configured such that it can be controlled to be on/off so that electric currents flowing simultaneously in the first and second primary-side coils are opposite in direction to each other.

8 Claims, 15 Drawing Sheets

(51) Int. Cl.
   *H01F 27/24* (2006.01)
   *H01F 27/28* (2006.01)
   *H02M 1/00* (2006.01)

(52) U.S. Cl.
   CPC ............ *H02M 3/28* (2013.01); *H02M 3/335*
         (2013.01); *H02M 3/33569* (2013.01); *H01F*
              *2027/2809* (2013.01); *H02M 2001/0064*
                                              (2013.01)

(56) References Cited

U.S. PATENT DOCUMENTS

| | | | |
|---|---|---|---|
| 6,859,130 B2* | 2/2005 | Nakashima | H01F 27/2804 29/602.1 |
| 7,199,569 B1* | 4/2007 | Nakahori | H02M 3/335 323/355 |
| 9,608,526 B2* | 3/2017 | Okura | H02J 5/005 |
| 10,083,791 B2* | 9/2018 | Njiende | H01F 30/06 |
| 2008/0101097 A1* | 5/2008 | Kawasaki | H01F 27/255 363/20 |
| 2008/0247195 A1* | 10/2008 | Nakahori | H02M 3/337 363/20 |
| 2009/0195173 A1* | 8/2009 | Morimoto | H01F 38/10 315/277 |
| 2015/0062951 A1 | 3/2015 | Nishikawa et al. | |

FOREIGN PATENT DOCUMENTS

| | | |
|---|---|---|
| JP | 2011077328 A | 4/2011 |
| JP | 2013062936 A | 4/2013 |
| JP | 2015050391 A | 3/2015 |

\* cited by examiner

INSULATION TYPE STEP-UP CONVERTER

TECHNICAL FIELD

The present invention relates to an insulation type step-up converter, and more particularly to an insulation type step-up converter which produces a DC low voltage from a DC high voltage.

BACKGROUND ART

Japanese Patent Laying-Open No. 2004-303857 (PTD 1), for example, discloses, as a step-up transformer included in a DC-DC (direct current-direct current) converter which is a type of switching power supply, a structure in which several spiral turns of a primary-side coil on the high-voltage side and a turn of a secondary-side coil on the low-voltage side are stacked. Japanese Patent Laying-Open No. 2011-77328 (PTD 2), for example, discloses a structure in which secondary-side coils on the low-voltage side obtained by coupling two coils in series, each being wound a turn, into the S shape are arranged to hold a primary-side coil on the high-voltage side therebetween from above and below.

CITATION LIST

Patent Documents

PTD 1: Japanese Patent Laying-Open No. 2004-303857
PTD 2: Japanese Patent Laying-Open No. 2011-77328

SUMMARY OF INVENTION

Technical Problem

An insulation type step-up converter which is a type of a DC-DC converter is requested to have a large step-up ratio which is a ratio of a low voltage of the primary-side coil of a step-up transformer to a high voltage of the secondary-side coil. To set a large step-up ratio when configuring a step-up transformer using the transformer disclosed in each of Japanese Patent Laying-Open Nos. 2004-303857 and 2011-77328, it is necessary to increase the number of turns of the secondary-side coil.

However, if the number of turns is increased while hardly increasing the entire size of the secondary-side coil, the current-carrying cross section of the winding of the secondary-side coil will decrease, so that heat generated by the secondary-side coil will increase. Although heat generation can be minimized by using a thick pattern formed on a printed circuit board or a resin-sealed thick copper plate as the secondary-side coil, cost increase is incurred.

The present invention was made in view of the above-described problem, and has an object to provide an insulation type step-up converter which can minimize an increase in heat generated by a secondary-side coil without raising manufacturing costs even at a large step-up ratio of a step-up transformer.

Solution to Problem

An insulation type step-up converter of the present invention includes a core, first and second primary-side coils, a secondary-side coil, and a switching element. The core includes a middle leg, and first and second outer legs. The switching element is configured such that it can be controlled to be on/off so that electric currents flowing simultaneously in the first and second primary-side coils are opposite in direction to each other.

Advantageous Effects of Invention

According to the present invention, since the number of turns of the secondary-side coil can be reduced, an increase in heat generated by the secondary-side coil can be minimized without raising manufacturing costs.

DESCRIPTION OF EMBODIMENTS

Hereinafter, embodiments of the present invention will be described based on the drawings.

First Embodiment

First, a circuit constituting an insulation type step-up converter of the present embodiment will be described using FIG. 1.

Figure 1:
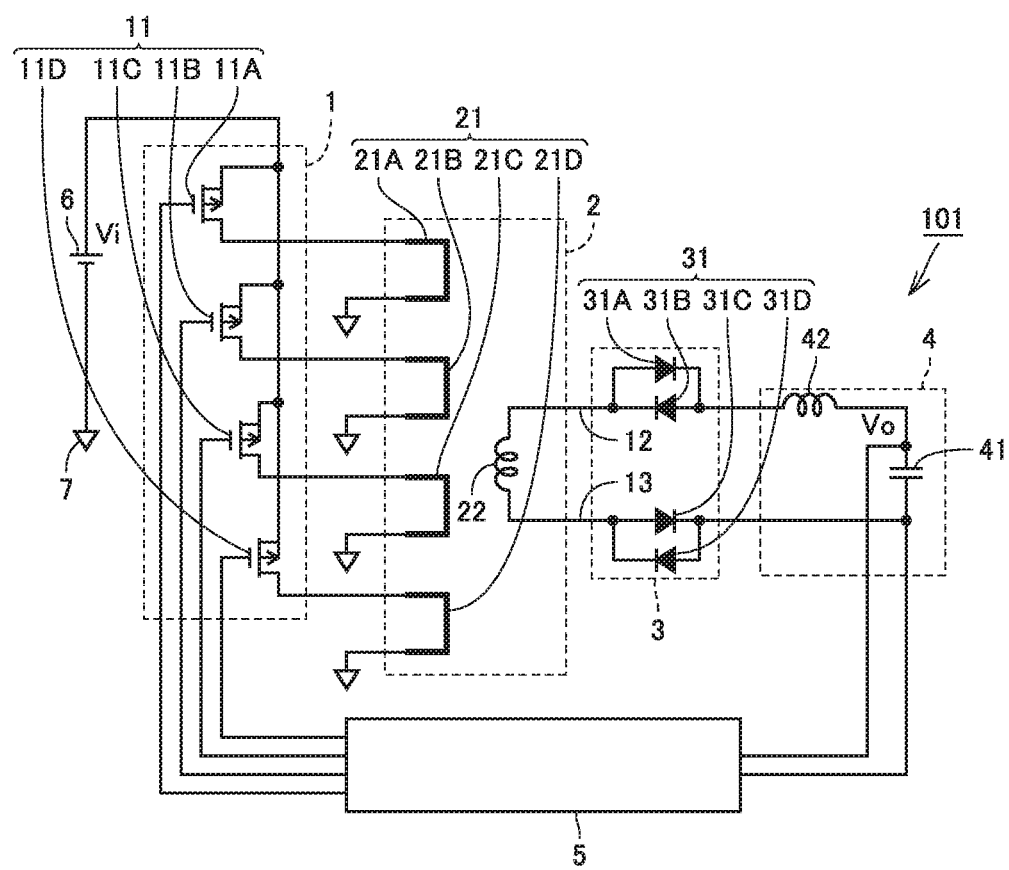
FIG. 1 is a circuit block diagram showing a first example of an insulation type step-up converter of a first embodiment.

Referring to FIG. 1, an insulation type step-up converter 101 of a first example of the present embodiment mainly has a primary-side drive circuit 1, a step-up transformer 2, a rectifier circuit 3, a smoothing circuit 4, and a control circuit 5.

Primary-side drive circuit 1 has four switching elements 11A, 11B, 11C, and 11D (which will be collectively called a switching element 11). Step-up transformer 2 has four primary-side coils 21A, 21B, 21C, and 21D (which will be collectively called a primary-side coil 21) and a secondary-side coil 22. Rectifier circuit 3 has four rectifier elements 31A, 31B, 31C, and 31D (which will be collectively called a rectifier element 31). Smoothing circuit 4 has a smoothing capacitor 41 and a smoothing coil 42.

In primary-side drive circuit 1, switching element 11 is connected as shown in FIG. 1. Specifically, switching element 11A is connected between a DC power supply 6 of a voltage Vi and primary-side coil 21A, and switching element 11B is connected between DC power supply 6 and primary-side coil 21B. Switching element 11C is connected between DC power supply 6 and primary-side coil 21C, and switching element 11D is connected between DC power supply 6 and primary-side coil 21D. Switching element 11 is a p channel type MOSFET (Metal Oxide Semiconductor Field Effect Transistor), for example.

Since switching element 11 is connected to control circuit 5, switching elements 11A to 11D are controlled by control circuit 5 so as to be alternately turned on and off. Specifically, a first state in which switching elements 11A and 11D are turned on and a second state in which switching elements 11B and 11C are turned on are brought about alternately at regular time intervals. Accordingly, in primary-side drive circuit 1, input voltage Vi from DC power supply 6 is applied to primary-side coils 21A and 21D in the first state, and input voltage Vi from DC power supply 6 is applied to primary-side coils 21B and 21C in the second state.

As described above, switching element 11 constitutes a so-called push-pull circuit by four switching elements 11A to 11D. However, the mode of switching element 11 is not limited to that shown in FIG. 1 as long as a voltage can be applied alternately to some of switching elements 11A to 11D between the first and second states.

One of a pair of ends of primary-side coil 21A is connected to switching element 11A described above, and the other end is connected to a reference potential 7 on the primary side of insulation type step-up converter 101. Similarly, one of a pair of ends of each of primary-side coils 21B, 21C and 21D is connected to each of switching elements 11B, 11C and 11D, and the other end is connected to reference potential 7 on the primary side of insulation type step-up converter 101.

A node 12, which is one of a pair of ends of secondary-side coil 22, is connected to the anode of rectifier element 31A and the cathode of rectifier element 31B. A node 13, which is the other end of the pair of ends of secondary-side coil 22, is connected to the anode of rectifier element 31C and the cathode of rectifier element 31D. The cathode of rectifier element 31A and the anode of rectifier element 31B are connected to smoothing coil 42, and smoothing coil 42 and smoothing capacitor 41 are connected in series, thereby constituting smoothing circuit 4. One of a pair of ends of smoothing capacitor 41 is connected to smoothing coil 42, and the other end is connected to the cathode of rectifier element 31C and the anode of rectifier element 31D.

Next, the structure of each component constituting step-up transformer 2 in the present embodiment will be described using FIGS. 2 to 5.

Figure 2:
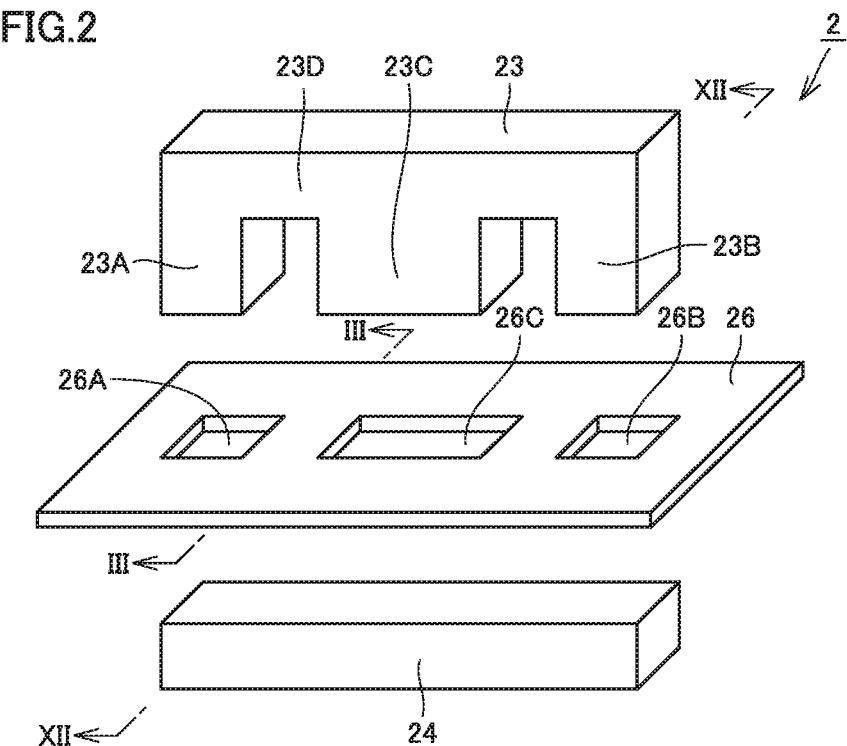
FIG. 2 is an exploded perspective view showing arrangement of cores and a multilayer printed board constituting a step-up transformer of the first embodiment.

Referring to FIG. 2, step-up transformer 2 of the present embodiment mainly has an E-shaped core 23 (core), an I-shaped core 24 and a multilayer printed board 26. E-shaped core 23 has outer legs 23A and 23B, a middle leg 23C and a core coupling part 23D shown in FIG. 2. It is noted that FIG. 2 is an exploded perspective view merely showing arrangement of the above-described respective components, not a mode in which these respective components have been assembled in step-up transformer 2 finally.

Outer leg 23A (first outer leg) extends in the same direction as middle leg 23C, that is, downward in FIG. 2, and is spaced from middle leg 23C (in the horizontal direction in FIG. 2). Outer leg 23B (second outer leg) is spaced from middle leg 23C (in the horizontal direction in FIG. 2) opposite to outer leg 23A with respect to middle leg 23C (i.e., on the right side of middle leg 23C in FIG. 2). That is, two outer legs 23A and 23B are arranged to sandwich middle leg 23C from the right and left sides in FIG. 2. Core coupling part 23D is a portion extending in the direction (horizontal direction in FIG. 2) crossing the direction in which outer legs 23A, 23B and middle leg 23C extend such that outer legs 23A, 23B and middle leg 23C extending in the vertical direction in FIG. 2 are connected to each other at their upper ends.

In FIG. 2, the cross section crossing the direction in which middle leg 23C extends is larger than the cross section crossing the direction in which outer legs 23A and 23B extend. More specifically, the cross sections of outer legs 23A and 23B in FIG. 2 are almost equal in area, and the sum of the areas of the cross sections of two outer legs 23A and 23B is almost equal to the area of the cross section of middle leg 23C. However, this mode is not a limitation.

E-shaped core 23 has a shape just like the character of "E" when seen from the front side in FIG. 2.

I-shaped core 24 has a rectangular parallelepiped shape extending in the horizontal direction in the drawing similarly to core coupling part 23D. Preferably, E-shaped core 23 and I-shaped core 24 each have a rectangular shape (long shape) in a congruence relationship with each other when FIG. 2 as a whole is seen from above (seen in plan view).

It is noted that both E-shaped core 23 and I-shaped core 24 are preferably made of generally-known ferrite or the like.

Multilayer printed board 26 is a flat plate-like component having a rectangular shape in plan view, for example. Multilayer printed board 26 has three through-holes 26A, 26B and 26C, for example, spaced from each other and formed in line in a manner to extend through multilayer printed board 26 from one main surface (the upper side in the drawing) to the other main surface (the lower side in the drawing).

Multilayer printed board 26 arranged to be sandwiched between E-shaped core 23 and I-shaped core 24 is set such that outer leg 23A is inserted through through-hole 26A, outer leg 23B is inserted through through-hole 26B and middle leg 23C is inserted through through-hole 26C, and outer and middle legs 23A, 23B and 23C are fixed such that their terminal ends (on the lowermost part in FIG. 2) are mounted on the surface of the long shape of I-shaped core 24. Step-up transformer 2 is thereby assembled such that outer legs 23A, 23B and part of middle leg 23C of E-shaped core 23 are inserted through through-holes 26A, 26B and 26C, respectively. As will be described later, assembled step-up transformer 2 has two magnetic paths, one formed by outer leg 23A and middle leg 23C, the other formed by outer leg 23B and middle leg 23C.

It is noted that two magnetic paths are formed here by combining E-shaped core 23 and I-shaped core 24, but this is not a limitation. A step-up transformer having two magnetic paths may be assembled by combining two E-shaped cores or combining two EER type cores, for example.

Figure 3:
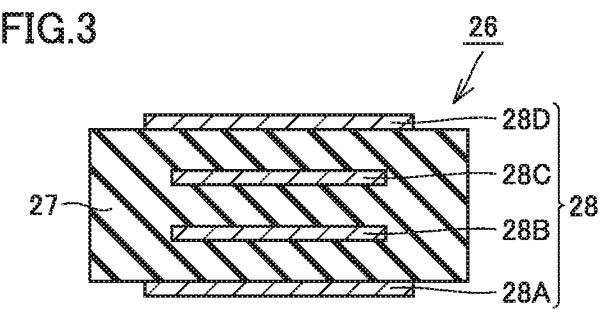
FIG. 3 is a schematic sectional view showing a structure of the multilayer printed board at a portion taken along the line III-III of FIG. 2.

Referring to FIGS. 2 and 3, multilayer printed board 26 is a substrate formed by using a substrate body 27 of an insulating material, such as generally-known resin, for example, as a base and a pattern 28 of a plurality of metallic thin films of copper or the like, for example, formed therein as traces. Multilayer printed board 26 of the present embodiment has a four-layer pattern of patterns 28A, 28B, 28C, and 28D, for example. Among them, pattern 28A of the lowermost layer may be formed so as to come into contact with the lowermost surface of substrate body 27 (i.e., so as to be the lowermost layer of multilayer printed board 26 as a whole). Pattern 28D of the uppermost layer may be formed so as to come into contact with the uppermost surface of substrate body 27 (i.e., so as to be the uppermost layer of multilayer printed board 26 as a whole). However, this mode is not a limitation, but patterns 28A and 28D, for example, may be formed within multilayer printed board 26 (similarly to patterns 28B and 28C). Patterns 28A to 28D are in the mode in which they are spaced from each other in the vertical direction in FIG. 3 by substrate body 27 made of an insulating material and are not electrically connected (not short-circuited) to each other unless they are connected by wiring vias or the like, for example.

Multilayer printed board 26 having four-layer patterns 28A to 28D as shown in FIG. 3 may also be called a four-layer printed circuit board.

Figure 4:
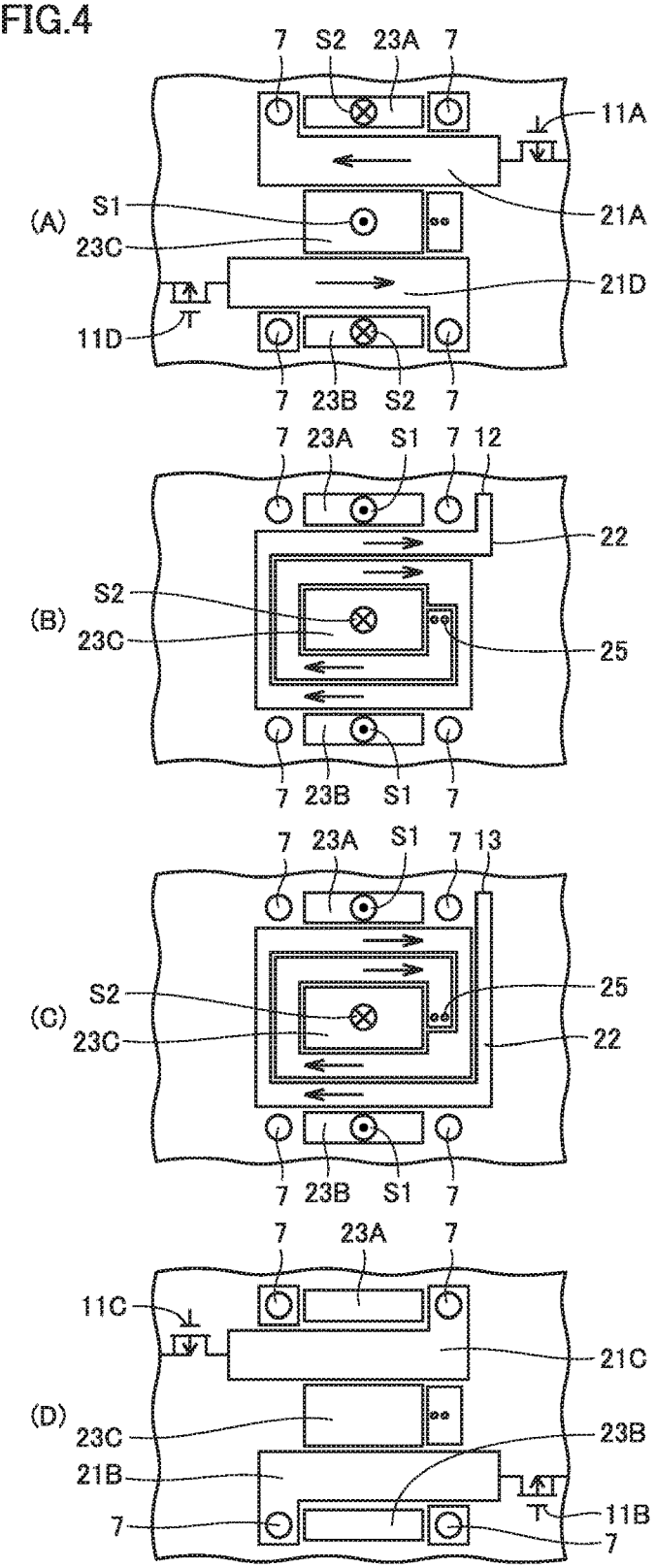
FIG. 4 shows a schematic plan view (A) showing a mode of coils and a first state of the coils in a first layer of a metallic thin film pattern in the multilayer printed board of FIG. 3 in a first example of the first embodiment, a schematic plan view (B) showing a mode of coils and the first state of the coils in a second layer of the metallic thin film pattern in the multilayer printed board of FIG. 3 in the first example of the first embodiment, a schematic plan view (C) showing a mode of coils and the first state of the coils in a third layer of the metallic thin film pattern in the multilayer printed board of FIG. 3 in the first example of the first embodiment, and a schematic plan view (D) showing a mode of coils and the first state of the coils in a fourth layer of the metallic thin film pattern in the multilayer printed board of FIG. 3 in the first example of the first embodiment.

Referring to FIG. 4 (A), when the first layer which is the lowermost layer of four-layer patterns 28A to 28D of multilayer printed board 26 is seen in plan view, primary-side coils 21A and 21D are arranged on this plane as the same layer as pattern 28A of FIG. 3. That is, above-described primary-side coils 21A and 21D may be considered as the same layer as pattern 28A (a film corresponding to pattern 28A), and are coils formed as a copper thin film pattern, for example.

Primary-side coil 21A (first primary-side coil) is arranged to include a region between outer leg 23A and middle leg 23C, and extends linearly in plan view at least in the region between outer leg 23A and middle leg 23C. That is, primary-side coil 21A can be regarded as equivalent to half of a turn (0.5 turn) around outer leg 23A in a pseudo manner. At one end (on the left side in FIG. 4 (A)) of the linear region interposed between outer leg 23A and middle leg 23C, primary-side coil 21A is bent so as to intersect approximately perpendicularly to the linearly extending direction, and reference potential 7 is connected to this bent portion. The drain of switching element 11A is connected to an end (on the right side in FIG. 4 (A)) opposite to the above-described one end of the linear region of primary-side coil 21A interposed between outer leg 23A and middle leg 23C. However, the mode having such a bent portion is not a limitation, but the coil may extend linearly from reference potential 7 to switching element 11A, for example.

Primary-side coil 21D (second primary-side coil) is arranged to include a region between outer leg 23B and middle leg 23C, and extends linearly in plan view at least in the region between outer leg 23B and middle leg 23C (a 0.5 turn around outer leg 23B in a pseudo-manner). At one end (on the right side in FIG. 4 (A)) of the linear region interposed between outer leg 23B and middle leg 23C, primary-side coil 21D is bent so as to intersect approximately perpendicularly to the linearly extending direction, and reference potential 7 is connected to this bent portion. The drain of switching element 11D is connected to an end (on the left side in FIG. 4 (A)) opposite to the above-described one end of the linear region of primary-side coil 21D interposed between outer leg 23B and middle leg 23C. However, the mode having such a bent portion is not a limitation, but the coil may extend linearly from reference potential 7 to switching element 11D, for example.

Referring to FIG. 4 (B), when the second lowermost layer of four-layer patterns 28A to 28D of multilayer printed board 26 is seen in plan view, secondary-side coil 22 is arranged on this plane as the same layer as pattern 28B of FIG. 3. That is, above-described secondary-side coil 22 may be considered as the same layer as pattern 28B (a film corresponding to pattern 28B), and is a coil formed as a copper thin film pattern, for example.

Secondary-side coil 22 is arranged to pass through the region between outer leg 23A and middle leg 23C, the region between outer leg 23B and middle leg 23C, and the region connecting these two regions. In more detail, secondary-side coil 22 is in a mode of being spirally wound two turns around middle leg 23C, for example, as shown in the drawing. Spiral secondary-side coil 22 is configured such that a gap is left between the first turn and the second turn to prevent them from being electrically short-circuited. Secondary-side coil 22 extends linearly in each of the above-described regions, and is bent approximately perpendicularly at boundaries between the respective regions. Accordingly, secondary-side coil 22 is wound around middle leg 23C so as to present a rectangular shape in plan view.

Referring to FIG. 4 (C), when the third lowermost layer of four-layer patterns 28A to 28D of multilayer printed board 26 is seen in plan view, secondary-side coil 22 is arranged on this plane as the same layer as pattern 28C of FIG. 3. That is, above-described secondary-side coil 22 may be considered as the same layer as pattern 28C (a film corresponding to pattern 28C), and is a coil formed as a copper thin film pattern, for example.

Secondary-side coil 22 shown in FIG. 4 (C) is in a mode of being spirally wound two turns around middle leg 23C, for example, approximately similarly to secondary-side coil 22 shown in FIG. 4 (B). Two turns of secondary-side coil 22 shown in FIG. 4 (B) and two turns of secondary-side coil 22 shown in FIG. 4 (C) are electrically connected together at their ends by connection vias 25 extending in the vertical direction in FIG. 3 (thickness direction of multilayer printed board 26), and a combination of them functions as one secondary-side coil 22. An end of secondary-side coil 22 of FIG. 4 (B) opposite to the end connected to connection vias 25 corresponds to node 12 of FIG. 1, and an end of secondary-side coil 22 of FIG. 4 (C) opposite to the end connected to connection vias 25 corresponds to node 13 of FIG. 1. A total of four turns of secondary-side coil 22 is thereby formed.

Referring to FIG. 4 (D), when the uppermost layer of four-layer patterns 28A to 28D of multilayer printed board 26 is seen in plan view, primary-side coils 21C and 21B are arranged on this plane as the same layer as pattern 28D of FIG. 3. That is, above-described primary-side coils 21C and 21B may be considered as the same layer as pattern 28D (a film corresponding to pattern 28D), and are coils formed as a copper thin film pattern, for example.

Primary-side coil 21C (third primary-side coil) is arranged to include a region between outer leg 23A and middle leg 23C, and extends linearly in plan view at least in the region between outer leg 23A and middle leg 23C (a 0.5 turn around outer leg 23A in a pseudo-manner). At one end (on the right side in FIG. 4 (B)) of the linear region interposed between outer leg 23A and middle leg 23C, primary-side coil 21C is bent so as to intersect approximately perpendicularly to the linearly extending direction, and reference potential 7 is connected to this bent portion. The drain of switching element 11C is connected to an end (on the left side in FIG. 4 (B)) opposite to the above-described one end of the linear region of primary-side coil 21C interposed between outer leg 23A and middle leg 23C. However, the mode having such a bent portion is not a limitation, but the coil may extend linearly from reference potential 7 to switching element 11C, for example.

Primary-side coil 21B (fourth primary-side coil) is arranged to include a region between outer leg 23B and middle leg 23C, and extends linearly in plan view at least in the region between outer leg 23B and middle leg 23C (a 0.5 turn around outer leg 23B in a pseudo-manner). At one end (on the left side in FIG. 4 (B)) of the linear region interposed between outer leg 23B and middle leg 23C, primary-side coil 21B is bent so as to intersect approximately perpendicularly to the linearly extending direction, and reference potential 7 is connected to this bent portion. The drain of switching element 11B is connected to an end (on the right side in FIG. 4 (B)) opposite to the above-described one end of the linear region of primary-side coil 21B interposed between outer leg 23B and middle leg 23C. However, the mode having such a bent portion is not a limitation, but the coil may extend linearly from reference potential 7 to switching element 11B, for example.

As described above, in multilayer printed board 26, primary-side and secondary-side coils 21 and 22 are formed to be stacked one on the other. Middle leg 23C of E-shaped core 23 extends through multilayer printed board 26 so as to be surrounded by these primary-side and secondary-side coils 21 and 22.

The portions of above-described primary-side coils 21A to 21D (interposed between the outer and middle legs) extending linearly in plan view overlap each other at least partly, and also overlap secondary-side coil 22. Specifically, at least part of the portion of each of first and second primary-side coils 21A and 21D extending in the horizontal direction in FIG. 4 overlaps, and is spaced from, the portion of secondary-side coil 22 extending in the horizontal direction in FIG. 4. Similarly, at least part of the portion of each of third and fourth primary-side coils 21C and 21B extending in the horizontal direction in FIG. 4 overlaps, and is spaced from, the portion of secondary-side coil 22 extending in the horizontal direction in FIG. 4. Therefore, primary-side coils 21A to 21D arranged as merely a half turn (0.5 turn) are larger in width than secondary-side coil 22 having a narrow width so as to enable spiral two-turn winding in the regions between outer legs 23A, 23B and middle leg 23C.

As was discussed in the description of FIG. 1, a voltage is applied to different coils of primary-side coil 21 between the first state and the second state. The coils of primary-side coil 21 in which electric current flows change between the first state and the second state, so that the direction of electric current flowing in secondary-side coil 22 changes between the first state and the second state. This will be described next.

Here, as indicated by the arrows in FIG. 4 (A), for example, the first state in which switching elements 11A and 11D are turned on, so that a positive input voltage of DC power supply 6 is applied to primary-side coils 21A and 21D, causing electric current to flow from switching element 11A toward reference potential 7 and causing electric current to flow from switching element 11D toward reference potential 7 is discussed.

With this electric current, a magnetic flux S1 upward perpendicularly to the sheet of drawing occurs in middle leg 23C sandwiched between primary-side coils 21A and 21D, and a magnetic flux is created in a loop in accordance with two magnetic paths formed between outer legs 23A, 23B and middle leg 23C, respectively. Therefore, a magnetic flux S2 occurs in outer legs 23A and 23B downward perpendicularly to the sheet of drawing in the opposite direction to middle leg 23C.

In FIGS. 4 (B) and (C), an induced electromotive force occurs in secondary-side coil 22 so as to cancel out magnetic flux S1 in middle leg 23C in FIG. 4 (A) described above, that is, such that magnetic flux S2 occurs, and magnetic flux S1 occurs in outer legs 23A and 23B. With this induced electromotive force, electric current flows from the inside toward the outside of the spiral of secondary-side coil 22 in FIG. 4 (B), and from the outside toward the inside of the spiral of secondary-side coil 22 in FIG. 4 (C).

In FIG. 4 (D), an induced electromotive force occurs in primary-side coils 21B and 21C such that magnetic flux S2 which cancels out magnetic flux S1 in middle leg 23C in FIG. 4 (A) described above occurs in middle leg 23C, and magnetic flux S1 which cancels out magnetic flux S2 in outer legs 23A and 23B in FIG. 4 (A) occurs in outer legs 23A and 23B. However, since switching elements 11B and 11C are off, electric current does not flow in primary-side coils 21B and 21C.

Figure 5:
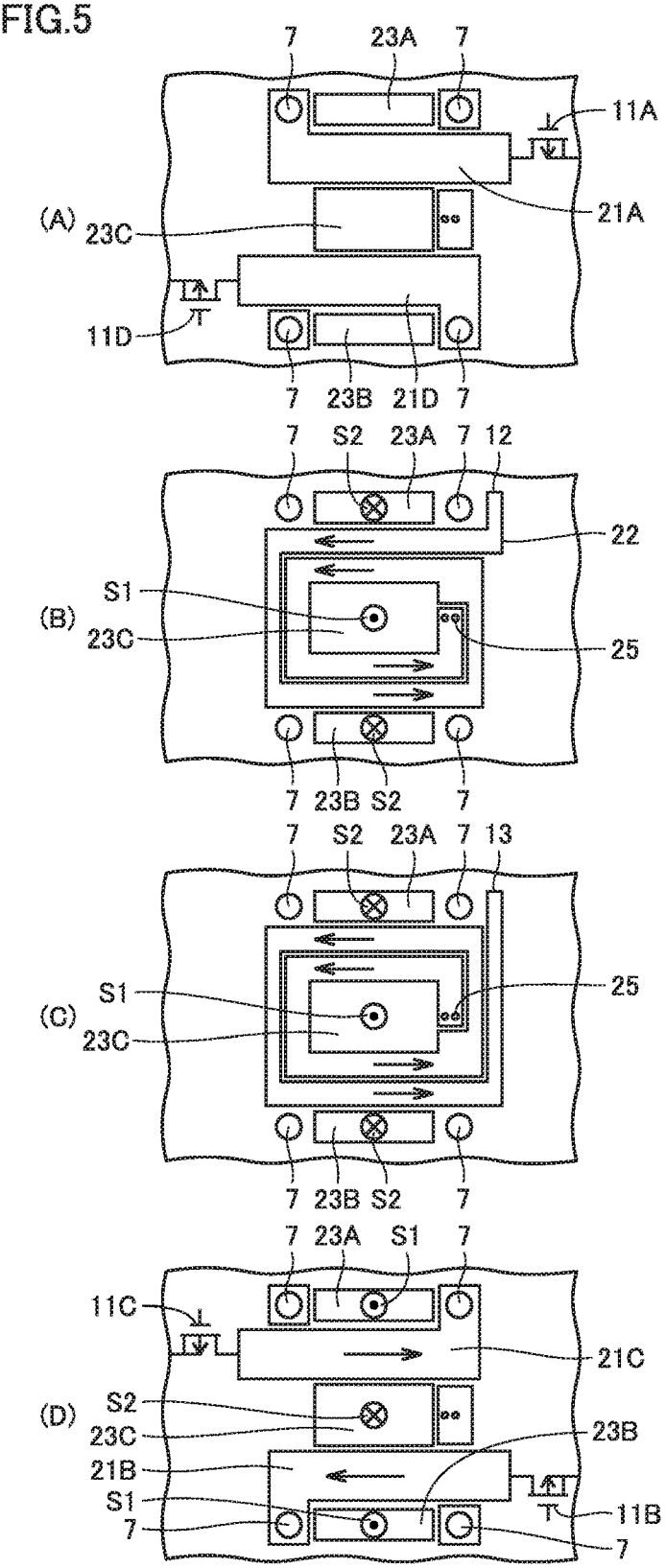
FIG. 5 shows a schematic plan view (A) showing a mode of coils and a second state of the coils in the first layer of the metallic thin film pattern in the multilayer printed board of FIG. 3 in the first example of the first embodiment, a schematic plan view (B) showing a mode of coils and the second state of the coils in the second layer of the metallic thin film pattern in the multilayer printed board of FIG. 3 in the first example of the first embodiment, a schematic plan view (C) showing a mode of coils and the second state of the coils in the third layer of the metallic thin film pattern in the multilayer printed board of FIG. 3 in the first example of the first embodiment, and a schematic plan view (D) showing a mode of coils and the second state of the coils in the fourth layer of the metallic thin film pattern in the multilayer printed board of FIG. 3 in the first example of the first embodiment.

Next, as indicated by the arrows in FIG. 5 (D), the second state in which switching elements 11B and 11C are turned on, so that a positive input voltage of DC power supply 6 is applied to primary-side coils 21B and 21C, causing electric current to flow from switching element 11B toward reference potential 7 and causing electric current to flow from switching element 11C toward reference potential 7 is discussed.

With this electric current, magnetic flux S2 downward perpendicularly to the sheet of drawing occurs in middle leg 23C sandwiched between primary-side coils 21B and 21C, and a magnetic flux is created in a loop in accordance with two magnetic paths formed between outer legs 23A, 23B and middle leg 23C, respectively. Therefore, magnetic flux S1 occurs in outer legs 23A and 23B upward perpendicularly to the sheet of drawing in the opposite direction to middle leg 23C.

In FIGS. 5 (B) and (C), an induced electromotive force occurs in secondary-side coil 22 so as to cancel out magnetic flux S2 in middle leg 23C in FIG. 5 (D) described above, that is, such that magnetic flux S1 occurs, and magnetic flux S2 occurs in outer legs 23A and 23B. With this induced electromotive force, electric current flows from the outside toward the inside of the spiral of secondary-side coil 22 in FIG. 5 (B), and from the inside toward the outside of the spiral of secondary-side coil 22 in FIG. 5 (C).

In FIG. 5 (A), an induced electromotive force occurs in primary-side coils 21A and 21D such that magnetic flux S1 which cancels out magnetic flux S2 in middle leg 23C in FIG. 5 (D) described above occurs in middle leg 23C, and magnetic flux S2 which cancels out magnetic flux S1 in outer legs 23A and 23B in FIG. 5 (D) occurs in outer legs 23A and 23B. However, since switching elements 11A and 11D are off, electric current does not flow in primary-side coils 21A and 21D.

Next, changes in voltage applied to each coil between the above-described respective states will be described using FIG. 6.

Figure 6:
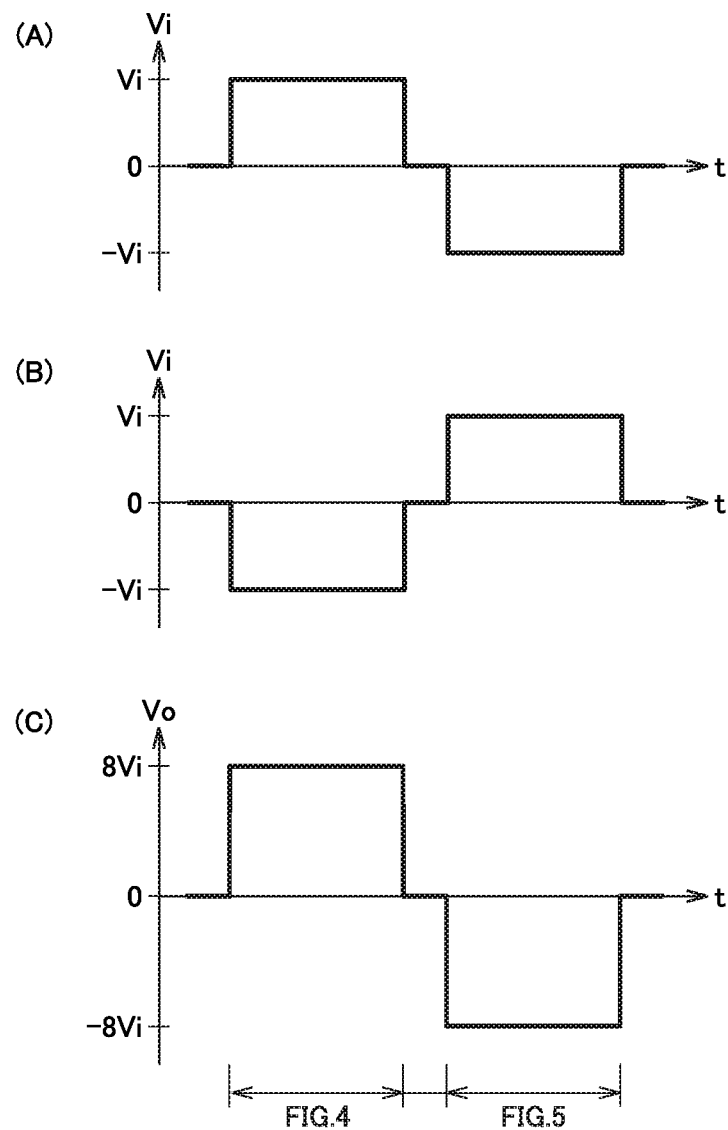
FIG. 6 shows a graph (A) showing time changes in voltage applied to primary-side coils 21A and 21D, a graph (B) showing time changes in voltage applied to primary-side coils 21B and 21C, and a graph (C) showing time changes in voltage applied to a secondary-side coil.

Referring to FIG. 6 (A), voltage Vi is first applied to primary-side coils 21A and 21D by primary-side drive circuit 1 in the first state shown in FIG. 4. At this time, a voltage is produced and electric current flows in secondary-side coil 22 as well, as shown in FIG. 6 (C). However, depending on the ratio of the number of turns of primary-side coil 21 to that of secondary-side coil 22 in step-up transformer 2, the voltage in secondary-side coil 22 is higher than the voltage in primary-side coil 21, and is 8 Vi here. Referring to FIG. 6 (B), at this time, a negative voltage −Vi reversed in phase (shifted by 180°) is applied to primary-side coils 21B and 21C, as an induced electromotive force for canceling out voltage Vi applied to primary-side coils 21A and 21D. Such a voltage is applied to primary-side coils 21B and 21C, but the electric current is interrupted since switching elements 11B and 11C are off as described above.

Next, when in the second state shown in FIG. 5, voltage Vi is applied to primary-side coils 21B and 21C as shown in FIG. 6 (B). At this time, as shown in FIG. 6 (C), a voltage −8 Vi in the direction opposite to the direction in the first state is produced and electric current flows in the opposite direction in secondary-side coil 22. Referring to FIG. 6 (A), at this time, negative voltage −Vi reversed in phase (shifted by) 180° is applied to primary-side coils 21A and 21D, as an induced electromotive force for canceling out voltage Vi applied to primary-side coils 21B and 21C. Such a voltage is applied to primary-side coils 21A and 21D, but the electric current is interrupted since switching elements 11A and 11D are off as described above.

Both in the above-described first and second states, a mode is brought about in which a voltage produced in secondary-side coil 22 (output from secondary-side coil 22) is similar to the DC voltage applied only in one direction by rectification of electric current in rectifier element 31, and is further smoothed in smoothing circuit 4 (smoothing capacitor 41 and smoothing coil 42). A smoothed DC voltage Vo is thereby applied to the both ends of smoothing capacitor 41.

Next, variations of the present embodiment will be described.

Figure 7:
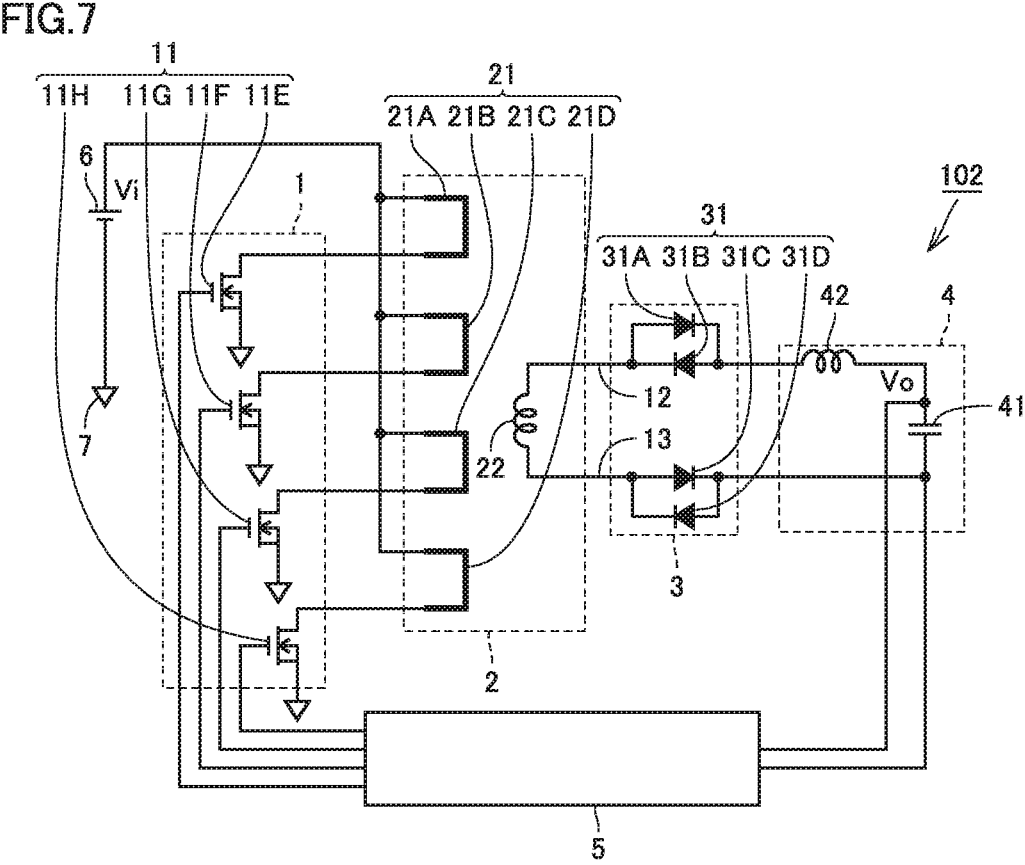
FIG. 7 is a circuit block diagram showing a second example of the insulation type step-up converter of the first embodiment.
Figure 8:
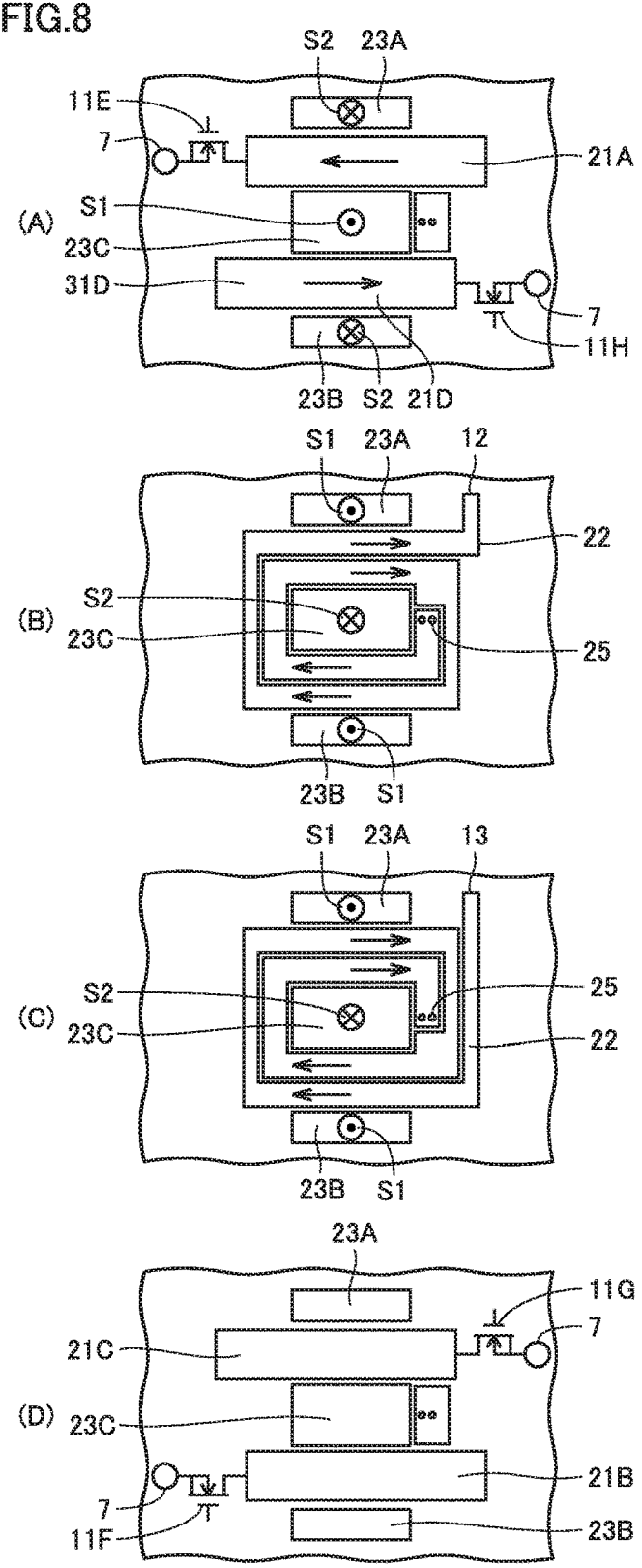
FIG. 8 shows a schematic plan view (A) showing a mode of coils and the first state of the coils in the first layer of the metallic thin film pattern in the multilayer printed board of FIG. 3 in a second example of the first embodiment, a schematic plan view (B) showing a mode of coils and the first state of the coils in the second layer of the metallic thin film pattern in the multilayer printed board of FIG. 3 in the second example of the first embodiment, a schematic plan view (C) showing a mode of coils and the first state of the coils in the third layer of the metallic thin film pattern in the multilayer printed board of FIG. 3 in the second example of the first embodiment, and a schematic plan view (D) showing a mode of coils and the first state of the coils in the fourth layer of the metallic thin film pattern in the multilayer printed board of FIG. 3 in the second example of the first embodiment.
Figure 9:
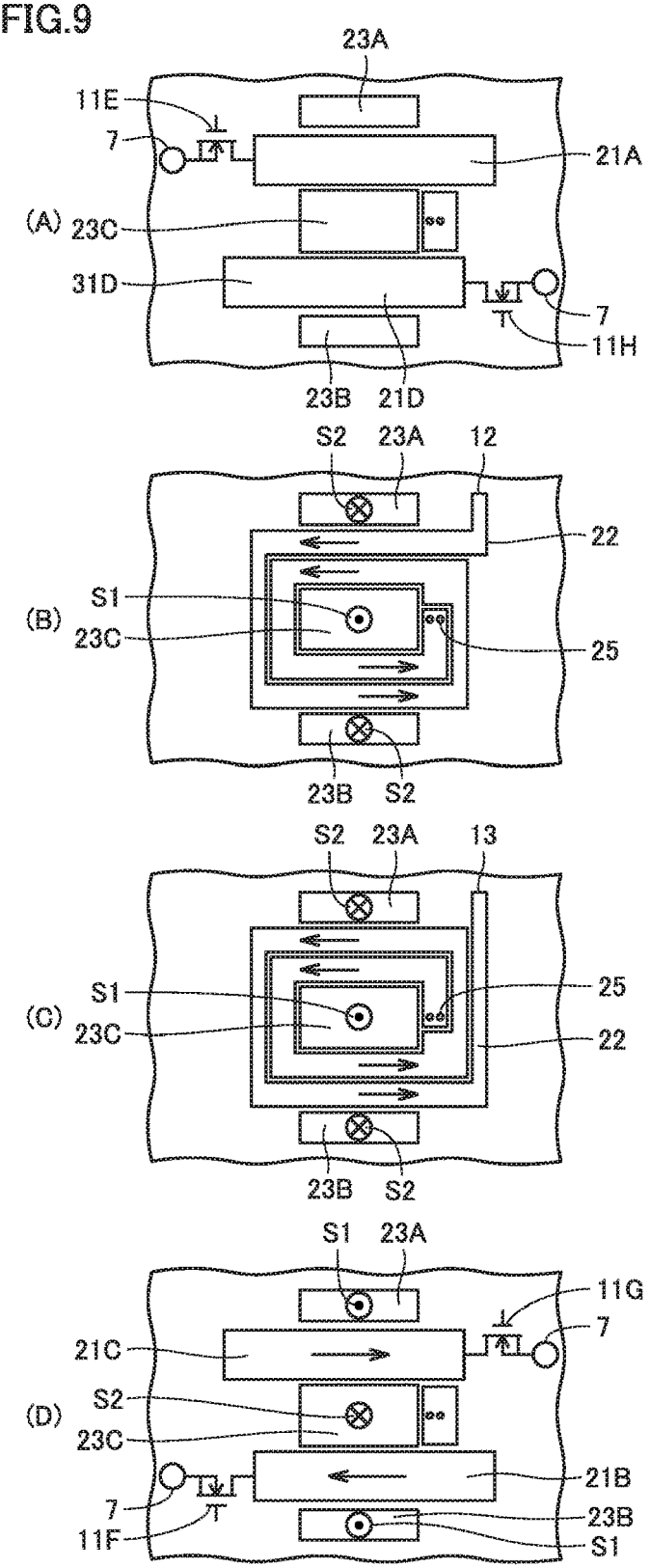
FIG. 9 shows a schematic plan view (A) showing a mode of coils and the second state of the coils in the first layer of the metallic thin film pattern in the multilayer printed board of FIG. 3 in the second example of the first embodiment, a schematic plan view (B) showing a mode of coils and the second state of the coils in the second layer of the metallic thin film pattern in the multilayer printed board of FIG. 3 in the second example of the first embodiment, a schematic plan view (C) showing a mode of coils and the second state of the coils in the third layer of the metallic thin film pattern in the multilayer printed board of FIG. 3 in the second example of the first embodiment, and a schematic plan view (D) showing a mode of coils and the second state of the coils in the fourth layer of the metallic thin film pattern in the multilayer printed board of FIG. 3 in the second example of the first embodiment.

Referring to FIGS. 7, 8 and 9, an insulation type step-up converter 102 of a second example of the present embodiment basically has a similar configuration to insulation type step-up converter 101 of the first example. However, insulation type step-up converter 102 differs from insulation type step-up converter 101 in connection between primary-side coils 21A to 21D and primary-side drive circuit 1.

Specifically, switching element 11, that is, four switching elements 11E, 11F, 11G and 11H are each an n channel type MOFEST, for example. One ends of primary-side coils 21A, 21B, 21C and 21D are connected to the drains of switching elements 11E, 11F, 11G and 11H, respectively, and the other ends are connected to voltage Vi of DC power supply 6. It is noted that in FIGS. 8 (A) and (D) primary-side coils 21A to 21D are not bent at the ends connected to switching elements 11E to 11H (reference potential 7), respectively, different from FIGS. 4 (A) and (D), but this is not an essential part of the embodiment. In FIGS. 8 (A) and (D), primary-side coils 21A to 21D may be bent similarly to those in FIGS. 4 (A) and (D).

Referring to FIG. 8, the operation in the first state in which switching elements 11E and 11H are turned on, that is, the direction of the magnetic flux in core 23 and the directions of electric currents in primary-side coil 21 and secondary-side coil 22 are basically similar to those in FIG. 4. Referring to FIG. 9, the operation in the second state in which switching elements 11F and 11G are turned on, that is, the direction of the magnetic flux in core 23 and the directions of electric currents in primary-side coil 21 and secondary-side coil 22 are basically similar to those in FIG. 5.

It is noted that since the remaining configuration of the second example of the present embodiment is approximately the same as that of the first example of the present embodiment, the same reference characters are allotted to the same elements, and description thereof will not be repeated.

Figure 10:
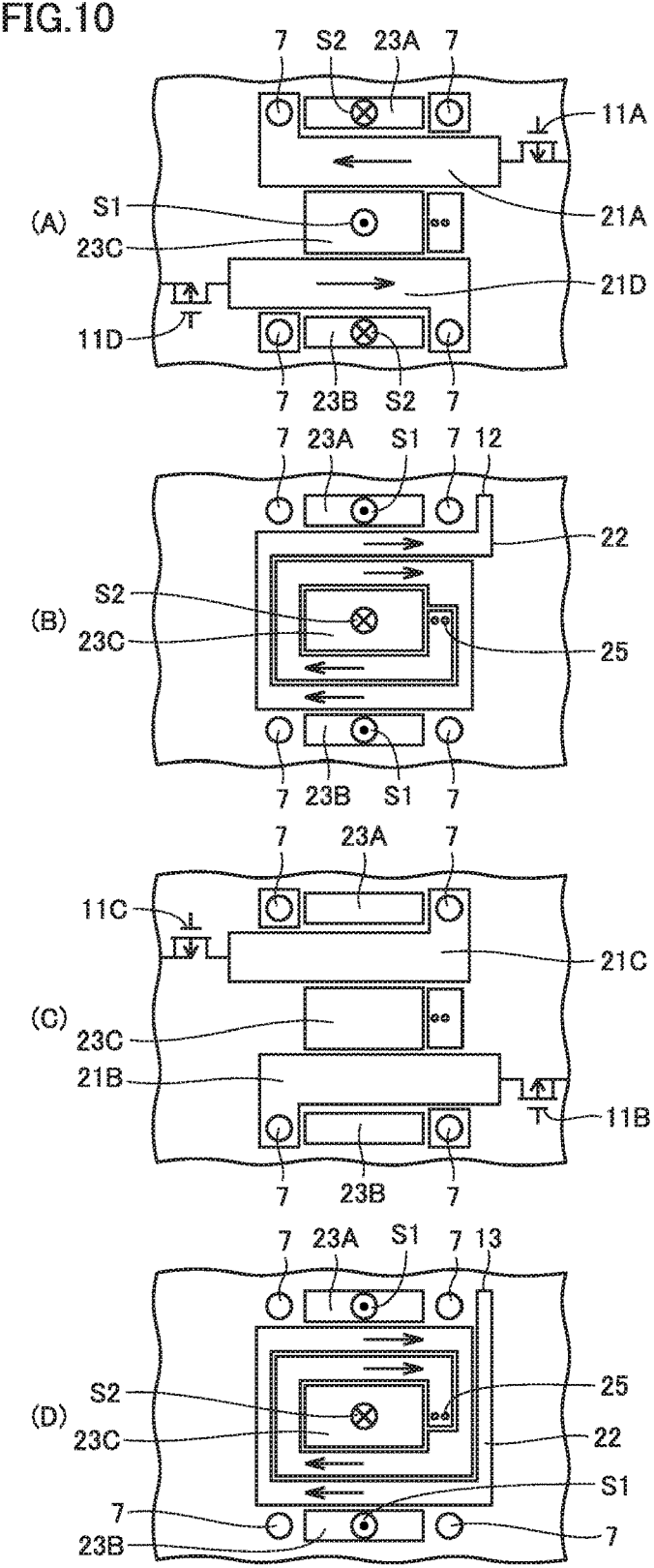
FIG. 10 shows a schematic plan view (A) showing a mode of coils and the first state of the coils in the first layer of the metallic thin film pattern in the multilayer printed board of FIG. 3 in a third example of the first embodiment, a schematic plan view (B) showing a mode of coils and the first state of the coils in the second layer of the metallic thin film pattern in the multilayer printed board of FIG. 3 in the third example of the first embodiment, a schematic plan view (C) showing a mode of coils and the first state of the coils in the third layer of the metallic thin film pattern in the multilayer printed board of FIG. 3 in the third example of the first embodiment, and a schematic plan view (D) showing a mode of coils and the first state of the coils in the fourth layer of the metallic thin film pattern in the multilayer printed board of FIG. 3 in the third example of the first embodiment.

Next, referring to FIG. 10 (A) to (D), an insulation type step-up converter of a third example of the present embodiment basically has a similar configuration to the first example. Here, however, third-layer pattern 28C and fourth-layer pattern 28D are configured in a reverse manner to FIGS. 4 (C) and (D) although first-layer pattern 28A and second-layer pattern 28B of multilayer printed board 26 (see FIG. 3) are the same as those in FIGS. 4 (A) and (B). That is, primary-side coils 21B and 21C identical to those shown in FIG. 4 (D) correspond to third-layer pattern 28C shown in FIG. 10 (C), and secondary-side coil 22 identical to that shown in FIG. 4 (C) corresponds to fourth-layer pattern 28D shown in FIG. 10 (D).

That is, in the first example, patterns 28A, 28B, 28C, and 28D are stacked in this order so as to correspond to primary-side coil 21, secondary-side coil 22, secondary-side coil 22, and primary-side coil 21, respectively. However, this is not a limitation, but patterns 28A, 28B, 28C, and 28D may be stacked in this order so as to correspond to primary-side coil 21, secondary-side coil 22, primary-side coil 21, and secondary-side coil 22, respectively, as in the third example.

Figure 11:
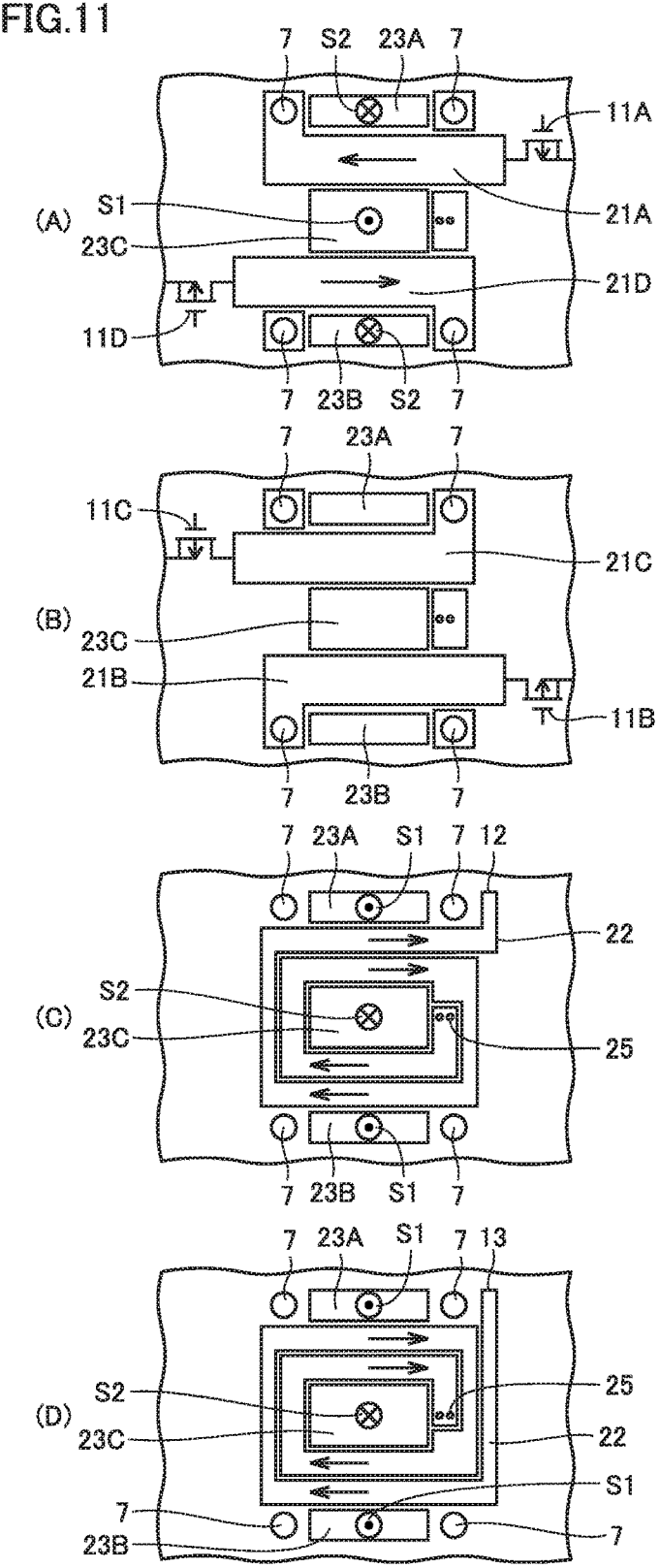
FIG. 11 shows a schematic plan view (A) showing a mode of coils and the first state of the coils in the first layer of the metallic thin film pattern in the multilayer printed board of FIG. 3 in a fourth example of the first embodiment, a schematic plan view (B) showing a mode of coils and the first state of the coils in the second layer of the metallic thin film pattern in the multilayer printed board of FIG. 3 in the fourth example of the first embodiment, a schematic plan view (C) showing a mode of coils and the first state of the coils in the third layer of the metallic thin film pattern in the multilayer printed board of FIG. 3 in the fourth example of the first embodiment, and a schematic plan view (D) showing a mode of coils and the first state of the coils in the fourth layer of the metallic thin film pattern in the multilayer printed board of FIG. 3 in the fourth example of the first embodiment.

Referring to FIG. 11 (A) to (D), an insulation type step-up converter of a fourth example of the present embodiment basically has a similar configuration to the first example. Here, however, patterns 28A, 28B, 28C, and 28D are stacked in this order so as to correspond to primary-side coil 21, primary-side coil 21, secondary-side coil 22, and secondary-side coil 22, respectively. That is, primary-side coils 21B and 21C identical to those shown in FIG. 4 (D) correspond to second-layer pattern 28B shown in FIG. 11 (B), and secondary-side coil 22 identical to that shown in FIG. 4 (B) corresponds to third-layer pattern 28C shown in FIG. 11 (C). Secondary-side coil 22 identical to that shown in FIG. 4 (C) corresponds to fourth-layer pattern 28D shown in FIG. 11 (D).

FIGS. 10 and 11 are different only in the order of stacking of the respective layers, and the mode of each layer is identical to any of FIG. 4 (A) to (D). Therefore, both in the third and fourth examples, the operations in the above-described first and second states are similar to those in the first and second examples.

The third and fourth examples of the present embodiment are different from the first example of the present embodiment only in the above points, and the insulation type step-up converters of the third and fourth examples of the present embodiment have a circuit diagram similar to the circuit block diagram of insulation type step-up converter 101 of the first example shown in FIG. 1. Therefore, the same reference characters are allotted to the same elements, and description thereof will not be repeated.

According to the present embodiment, in each of the above-described examples, switching element 11 is configured such that it can be controlled to be on/off so as to cause electric currents in opposite directions to each other to flow simultaneously in first primary-side coil 21A and second primary-side coil 21D. Switching element 11 is also configured such that it can be controlled to be on/off so as to cause electric currents in opposite directions to each other to flow simultaneously in third primary-side coil 21C and fourth primary-side coil 21B. Switching element 11 is configured such that it can be controlled to be on/off so as to cause electric currents to flow alternately in first and second primary-side coils 21A and 21D, and third and fourth primary-side coils 21C and 21B. That is, the time at which electric currents flow simultaneously in first and second primary-side coils 21A and 21D and the time at which electric currents flow simultaneously in third and fourth primary-side coils 21B and 21C are different times from each other. During the time when electric currents flow simultaneously in primary-side coils 21A and 21D (first state), electric currents do not flow in primary-side coils 21B and 21C. During the time when electric currents flow simultaneously in primary-side coils 21B and 21C (second state), electric currents do not flow in primary-side coils 21A and 21D.

According to the present embodiment, in each of the above-described examples, first primary-side coil 21A and second primary-side coil 21D are arranged on the same first layer (on the same plane), and third primary-side coil 21C and fourth primary-side coil 21B are arranged on the same second layer (on the same plane) different from the above-described first layer.

In the present embodiment, however, although not shown, switching element 11 may be configured such that it can be controlled to be on/off so as to cause electric currents in opposite directions to each other to flow simultaneously in primary-side coils 21A and 21B in the first state, for example. In this case, switching element 11 is configured such that it can be controlled to be on/off so as to cause electric currents in opposite directions to each other to flow simultaneously in primary-side coils 21C and 21D in the second state. It is noted that this case is different from each of the above-described examples in that primary-side coil 21A serves as the first primary-side coil, primary-side coil 21B serves as the second primary-side coil, primary-side coil 21C serves as the third primary-side coil, and primary-side coil 21D serves as the fourth primary-side coil. When this case is applied to the present embodiment, the first and second primary-side coils will be arranged on layers different from each other, and the third and fourth primary-side coils will also be arranged on layers different from each other.

Here, operation effects of the insulation type step-up converters of the above-described present embodiment will be described.

First, voltages in opposite directions to each other can be applied to primary-side coil 21 by primary-side drive circuit 1 at regular time intervals. A DC input voltage can thereby be converted into an AC voltage, which allows a step-up by the mutual induction in step-up transformer 2.

As shown in FIG. 4 and FIG. 5, for example, primary-side coil 21 and secondary-side coil 22 are arranged so as to overlap each other at least partly. Therefore, the mutual induction effect in which electric current is going to flow to secondary-side coil 22 in the direction opposite to the direction of electric current in primary-side coil 21 can be highly obtained so as to cancel out changes in magnetic flux caused by the electric current in primary-side coil 21.

In the present embodiment, switching element 11 causes electric current to flow alternately only in either primary-side coil 21A or 21C arranged between outer leg 23A and middle leg 23C, and either primary-side coil 21B or 21D arranged between outer leg 23B and middle leg 23C, between the two states shown in FIGS. 4 and 5. Electric current flows in secondary-side coil 22 so as to produce a magnetic flux which cancels out changes in magnetic fluxes S1, S2 passing through middle leg 23 each time when the direction of electric current flowing in primary-side coil 21 is changed.

Rectifier element 31 is provided to rectify, that is, convert a positive and negative, that is, AC voltage and electric current output from secondary-side coil 22 into a DC voltage and electric current to obtain a DC output. Furthermore, the smoothing circuit can smooth, that is, further stabilize output values of the DC voltage and electric current rectified by the rectifier element.

For example, the directions of electric currents flowing simultaneously in primary-side coils 21A and 21D are opposite to each other, and the directions of electric currents flowing simultaneously in primary-side coils 21B and 21C are opposite to each other. Accordingly, two linear primary-side coils (equivalent to a 0.5 turn) in which electric currents flow simultaneously can be collectively made equivalent to a turn of a coil in a pseudo manner. This can cause step-up transformer 2 to achieve the step-up function using a turn of primary-side coil 21.

However, although the state of a turn is created in a pseudo manner as described above, the circuit as a whole is in the state in which primary-side coils 21A to 21D of 0.5 turn are aligned. Therefore, when considering the step-up ratio of step-up transformer 2, whole primary-side coil 21 can be considered to be equivalent to a coil of 0.5 turn combining these plurality of primary-side coils 21A to 21D.

Here, the configuration of a typical step-up transformer will be described as a comparative example. In the typical step-up transformer, the primary-side and secondary-side coils are both wound at least one or more turns in order to achieve the function as a transformer. That is, in the case of causing a voltage eight times the voltage in the primary-side coil to be produced in the secondary-side coil, for example, the secondary-side coil needs to be wound eight or more turns at the minimum and the primary-side coil needs to be wound one or more turns. As the step-up ratio increases, the number of turns of the secondary-side coil increases further. In this case, particularly in order to avoid an increase in the cross section of the whole secondary-side coil, it is necessary to reduce the cross section of the winding wire of the secondary-side coil. Then, the amount of heat generated by the electric current flowing in the secondary-side coil may increase to result in a malfunction in the whole insulation type step-up converter or the like.

Therefore, in the present embodiment, primary-side coil 21 wound a 0.5 turn between outer legs 23A, 23B and middle leg 23C is adopted. Accordingly, to achieve the same step-up ratio as the above-described comparative example, the number of turns of secondary-side coil 22 can be reduced to four turns in total, as shown in FIGS. 4 (B) and (C). Accordingly, the same step-up ratio as in the comparative example can be achieved without reducing the cross section of the winding wire of secondary-side coil 22, which can minimize an increase in heat generated by secondary-side coil 22. Since the number of turns of the primary-side coil is small, the current-carrying distance of the primary-side coil can be shortened.

Since the primary-side coil extends linearly in plan view, the flow of electric current in the primary-side coil is nearly linear. Therefore, electric current flows uniformly without concentrating on the neighborhood of the inner periphery of the coil as in a typical wound coil with many bent portions, for example. Also from this viewpoint, it can be said that heat generation can be reduced and distributed in the present embodiment. Furthermore, since the electric current flowing in the insulation type step-up converter can be distributed to four primary-side coils 21A to 21D, the amount of heat generated by each of four primary-side coils 21A to 21D can be reduced.

Regarding the present embodiment which enables reduction of heat generation as described above, the radiation path of the above-described step-up transformer will be described finally using FIG. 12.

Figure 12:
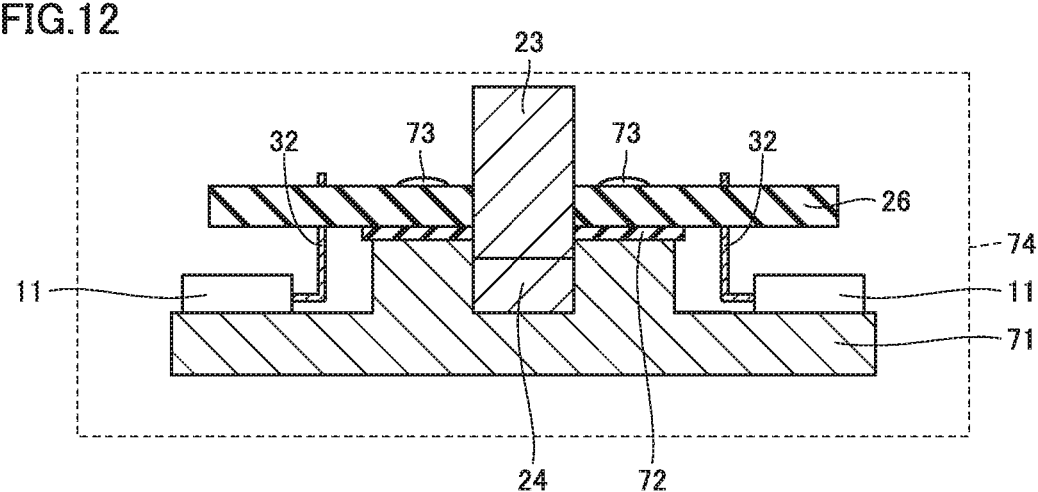
FIG. 12 is a schematic sectional view showing a mode in which a portion along the line XII-XII in FIG. 2 according to the first embodiment has been assembled and set in a radiator.

Referring to FIG. 12, in the step-up transformer after assembly at a portion along the line XII-XII of FIG. 2, one end of a pair of ends of each of primary-side coils 21 (21A-21D) formed in multilayer printed board 26 in the above-described mode is (electrically) connected to a corresponding one of switching elements 11 (11A-11D) with a wire 32, although not clearly shown in the drawing. On the other hand, the other end opposite to the above-described one end of a pair of ends of each of primary-side coils 21 (21A-21D) leads to a radiator 71.

Specifically, multilayer printed board 26 is mounted so as to come into contact with radiator 71 with an insulating sheet 72 interposed therebetween. In other words, insulating sheet 72 is mounted on radiator 71, and multilayer printed board 26 is mounted on insulating sheet 72 such that part of a surface of multilayer printed board 26 is in contact with insulating sheet 72. Here, primary-side coil 21 leading to radiator 71 covers not only the case in which primary-side coil 21 is directly connected to radiator 71, but also the case in which they are connected to each other with another component, such as insulating sheet 72, interposed therebetween. Therefore, primary-side coil 21 leading to radiator 71 includes both the case in which primary-side coil 21 and radiator 71 are electrically connected and the case in which they are not connected. It is noted that the sectional shape of radiator 71 is merely an example, and is not limited to this.

Radiator 71 functions as reference potential 7 (see FIGS. 1 and 4) on the primary side in insulation type step-up converters 101, 102 of the present embodiment. Primary-side coil 21 of multilayer printed board 26 is preferably fixed to radiator 71 with screws 73. With these screws 73, multilayer printed board 26 can be stably fixed to radiator 71, and heat and electricity can be easily transferred from primary-side coil 21 to radiator 71 through screws 73. Heat generated by primary-side coil 21 can also be transferred through the contact surface between pattern 28A (see FIG. 3) of the lowermost layer of multilayer printed board 26 and radiator 71. Primary-side coil 21 and radiator 71 can be electrically connected to each other through the contact surface between pattern 28A (see FIG. 3) of the lowermost layer of multilayer printed board 26 and radiator 71.

Summarizing the foregoing, there are three heat transfer paths in total (partly not shown) from primary-side coil 21 (pattern 28A) of multilayer printed board 26 to radiator 71. Specifically, the three paths include a path along which heat is directly transferred from primary-side coil 21 to radiator 71, a path along which heat is transferred from primary-side coil 21 to radiator 71 through screws 73 fixing primary-side coil 21 (with screws 73 interposed therebetween), and a path along which heat is transferred from primary-side coil 21 to radiator 71 through insulating sheet 72. Among them, the above-described first and second paths can also serve as paths of electric currents from primary-side coil 21 to radiator 71.

The surfaces of I-shaped core 24 and E-shaped core 23 are partly in contact with the top of radiator 71, and switching element 11 is placed on radiator 71 (to be in contact therewith). Accordingly, heat generated by cores 24, 23 and switching element 11 can also be easily transferred to radiator 71.

It is noted that radiator 71 can be air-cooled or water-cooled to radiate heat having received.

In multilayer printed board 26, primary-side coil 21 and secondary-side coil 22 need to be insulated by insulating substrate body 27 shown in FIG. 3 such that a relatively strict standard is met. Insulating sheet 72 interposed between primary-side coil 21 corresponding to pattern 28A of the lowermost layer of multilayer printed board 26 and radiator 71 which is reference potential 7 on the primary side, however, does not need to meet a very strict insulating standard. Since insulating sheet 72 can thus be reduced in thickness, heat generated by primary-side coil 21 can be transferred to radiator 71 more easily because of the interposition of insulating sheet 72.

Secondary-side coil 22 in multilayer printed board 26 has two paths: one for transferring heat to radiator 71 through substrate body 27 of multilayer printed board 26; and the other for transferring heat to radiator 71 through connection vias 25 (see FIGS. 4 (B) and (C)) and insulating sheet 72. Therefore, heat generated by secondary-side coil 22 can be radiated with high efficiency.

Radiator 71 described above may be integral with a housing 74 indicated by the broken line in FIG. 12 which houses respective components of insulation type step-up converters 101, 102 of the present embodiment. In this case, the other end opposite to the above-described one end of a pair of ends of each of primary-side coils 21 (21A-21D) leads to housing 74. Housing 74 can function as reference potential 7, similarly to radiator 71.

Second Embodiment

A second embodiment differs from the first embodiment particularly in the configuration of first- and fourth-layer coils of multilayer printed board 26. First, the structure of each component constituting step-up transformer 2 in the present embodiment will be described using FIGS. 13 to 16.

Figure 13:
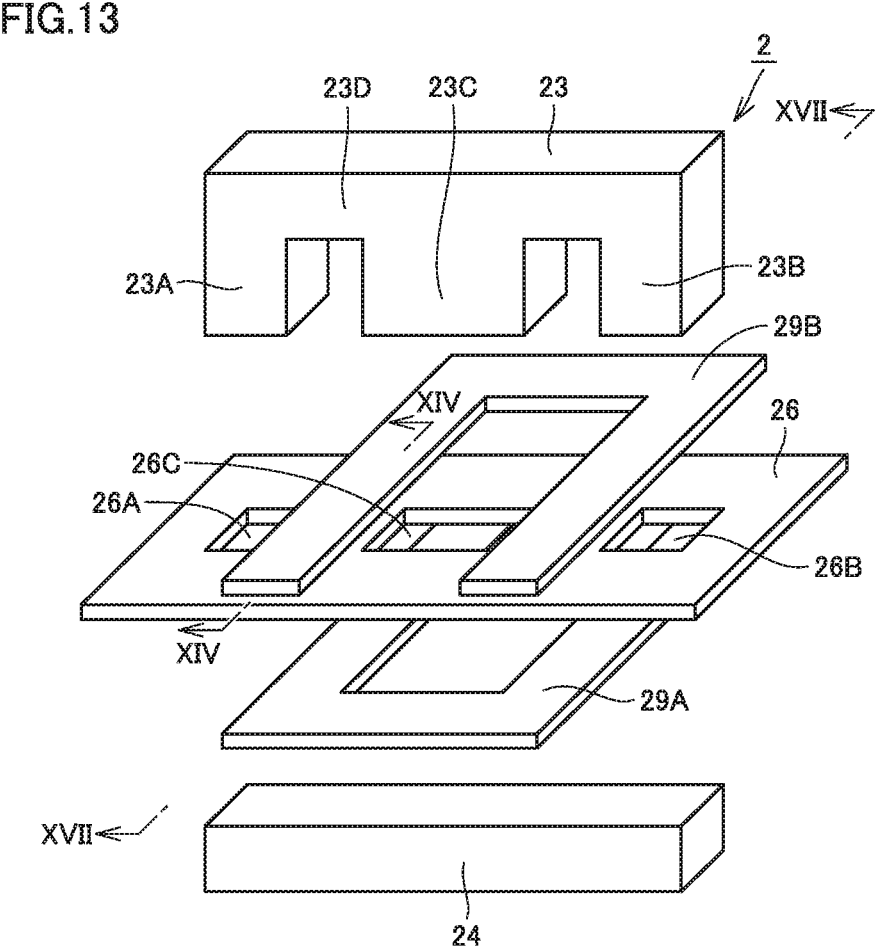
FIG. 13 is an exploded perspective view showing arrangement of cores and a multilayer printed board constituting a step-up transformer of a second embodiment.

Referring to FIG. 13, step-up transformer 2 of the present embodiment mainly has E-shaped core 23 (core), I-shaped core 24 and multilayer printed board 26, basically similarly to step-up transformer 2 of the first embodiment.

Figure 14:
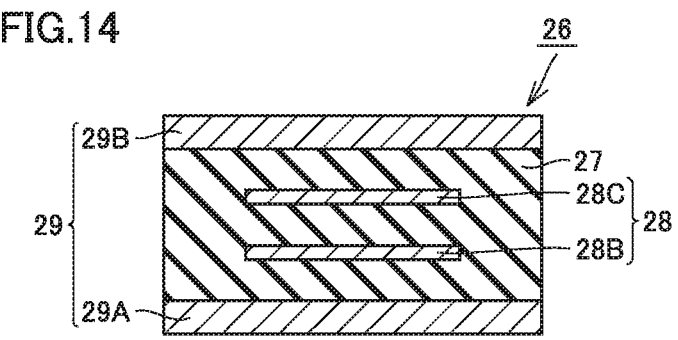
FIG. 14 is a schematic sectional view showing a structure of the multilayer printed board at a portion taken along the line XIV-XIV of FIG. 13.

Referring to FIGS. 13 and 14, in the present embodiment, thin film patterns of metal (copper) similar to those of the first embodiment are formed as second-layer pattern 28B and third-layer pattern 28C in the coils formed in four-layer multilayer printed board 26. That is, as shown in FIG. 15 (B), (C) and FIGS. 16 (B) and (C), a total of four turns of secondary-side coil 22 is formed as a copper thin film pattern, for example, similarly to FIG. 4 (B), (C) and FIGS. 5 (B) and (C).

In the present embodiment, however, a metal plate 29A and a metal plate 29B (collectively called a metal plate 29), each made of copper, for example, are arranged as the first layer as the lowermost layer and the fourth layer as the uppermost layer in the coils formed in four-layer multilayer printed board 26, instead of metal thin film patterns being formed. In FIG. 14, metal plates 29A and 29B are formed to come into contact with the lowermost surface and uppermost surface of substrate body 27, respectively, similarly to patterns 28A and 28D in FIG. 3. It is noted that aluminum or the like may be used instead of copper.

Referring to FIG. 14, metal plates 29A and 29B are formed thicker than patterns 28B and 28C. Metal plates 29A and 29B may be formed to have a width longer than the width of multilayer printed board 26 in the depth direction in FIG. 13, that is, to protrude from the both ends of multilayer printed board 26 in the depth direction in FIG. 13. It is noted that, as shown in FIG. 14, metal plates 29A and 29B and patterns 28B and 28C are spaced from each other by substrate body 27 of an insulating material (so as not to be short-circuited to each other), similarly to the first embodiment.

Figure 15:
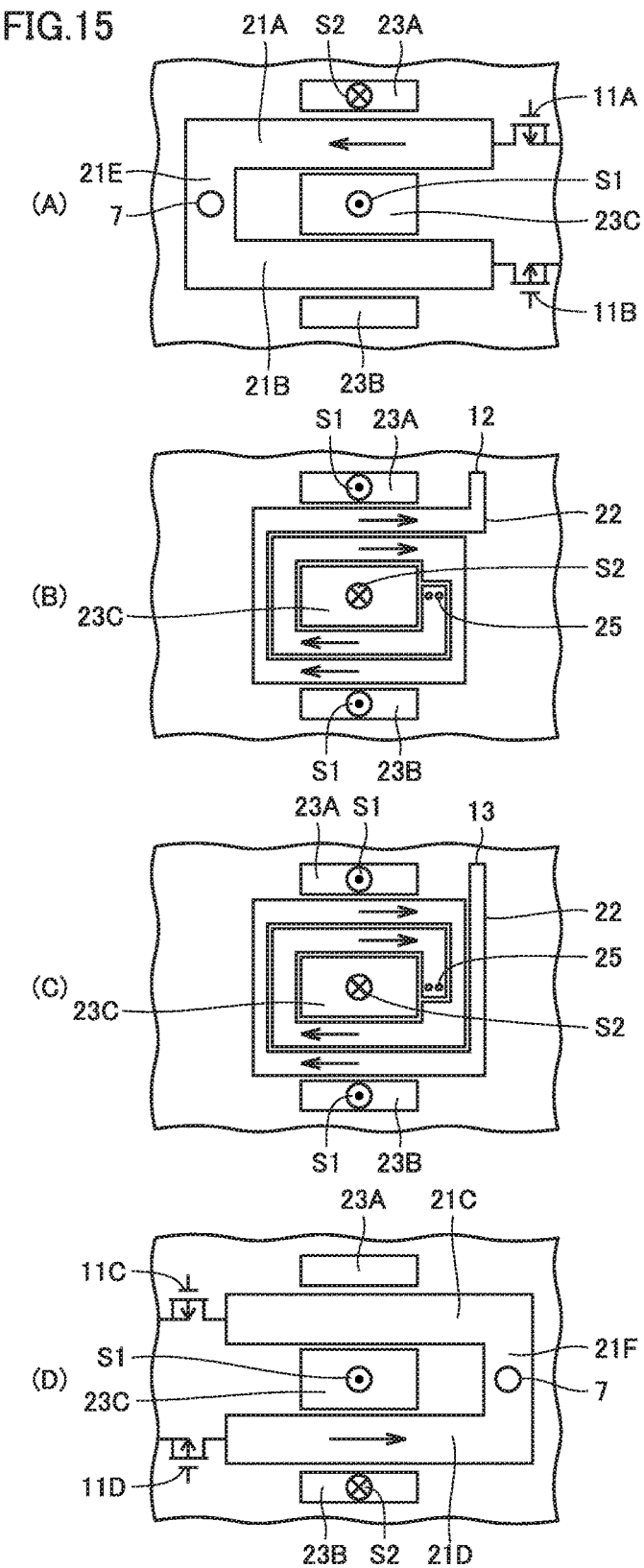
FIG. 15 shows a schematic plan view (A) showing a mode of coils and the first state of the coils in the first layer of the metallic thin film pattern in the multilayer printed board of FIG. 3 in a first example of the second embodiment, a schematic plan view (B) showing a mode of coils and the first state of the coils in the second layer of the metallic thin film pattern in the multilayer printed board of FIG. 3 in the first example of the second embodiment, a schematic plan view (C) showing a mode of coils and the first state of the coils in the third layer of the metallic thin film pattern in the multilayer printed board of FIG. 3 in the first example of the second embodiment, and a schematic plan view (D) showing a mode of coils and the first state of the coils in the fourth layer of the metallic thin film pattern in the multilayer printed board of FIG. 3 in the first example of the second embodiment.

Referring to FIG. 15 (A), when the first layer as the lowermost layer among the four layers (metal plates 29A, 29B and patterns 28B, 28C) of multilayer printed board 26 is seen in plan view, primary-side coils 21A and 21B are arranged on this plane as the same layer as metal plate 29 of FIG. 14.

Primary-side coil 21A (first primary-side coil) is arranged to include a region between outer leg 23A and middle leg 23C, and extends linearly (a 0.5 turn) in plan view at least in the region between outer leg 23A and middle leg 23C. Primary-side coil 21B (fourth primary-side coil) is arranged to include a region between outer leg 23B and middle leg 23C, and extends linearly (a 0.5 turn) in plan view at least in the region between outer leg 23B and middle leg 23C.

A connecting portion 21E is formed at the left ends of these primary-side coils 21A and 21B in FIG. 15 (A) so as to cross approximately perpendicularly to primary-side coils 21A and 21B. That is, primary-side coils 21A, 21B and connecting portion 21E are connected integrally as metal plate 29A. At the center of connecting portion 21E, a through-hole is formed which extends therethrough in the thickness direction from one main surface to the other main surface of metal plate 29A, and metal plate 29A leads to reference potential 7 via this through-hole. The drain of switching element 11A is connected to an end of primary-side coil 21A (on the right side in FIG. 15 (A)) opposite to the end connected to connecting portion 21E. Similarly, the drain of switching element 11B is connected to an end of primary-side coil 21B (on the right side in FIG. 15 (A)) opposite to the end connected to connecting portion 21E.

Also similarly, referring to FIG. 15 (D), when the fourth layer as the uppermost layer among the four layers of multilayer printed board 26 is seen in plan view, primary-side coils 21C and 21D are arranged on this plane as the same layer as metal plate 29B of FIG. 14.

Primary-side coil 21C (third primary-side coil) is arranged to include a region between outer leg 23A and middle leg 23C, and extends linearly (a 0.5 turn) in plan view at least in the region between outer leg 23A and middle leg 23C. Primary-side coil 21D (second primary-side coil) is arranged to include a region between outer leg 23B and middle leg 23C, and extends linearly (a 0.5 turn) in plan view at least in the region between outer leg 23B and middle leg 23C.

A connecting portion 21F is formed at the right ends of these primary-side coils 21C and 21D in FIG. 15 (D) so as to cross approximately perpendicularly to primary-side coils 21C and 21D. That is, primary-side coils 21C, 21D and connecting portion 21F are connected integrally as metal plate 29B. Connecting portion 21F has a through-hole similar to that of connecting portion 21E, and metal plate 29B leads to reference potential 7 via this through-hole. The drain of switching element 11C of rectifier element 31C is connected to an end of primary-side coil 21C on the left side in FIG. 15 (D). The drain of switching element 11D is connected to an end of primary-side coil 21D on the left side in FIG. 15 (D).

The flow of electric currents in primary-side coil 21 and secondary-side coil 22 in the insulation type step-up converter of the present embodiment having the above configuration changes basically similarly to the first embodiment based on a similar principle to that of the first embodiment.

Figure 16:
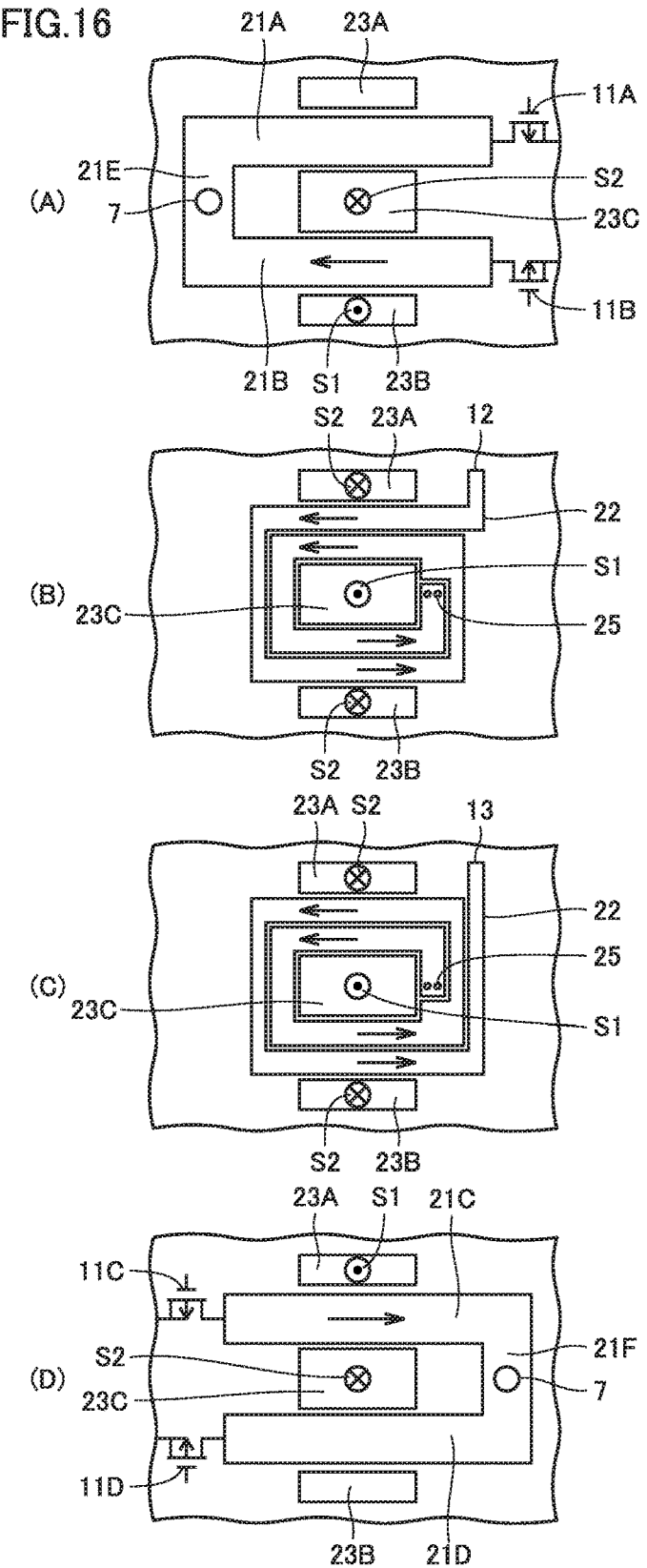
FIG. 16 shows a schematic plan view (A) showing a mode of coils and the second state of the coils in the first layer of the metallic thin film pattern in the multilayer printed board of FIG. 3 in the first example of the second embodiment, a schematic plan view (B) showing a mode of coils and the second state of the coils in the second layer of the metallic thin film pattern in the multilayer printed board of FIG. 3 in the first example of the second embodiment, a schematic plan view (C) showing a mode of coils and the second state of the coils in the third layer of the metallic thin film pattern in the multilayer printed board of FIG. 3 in the first example of the second embodiment, and a schematic plan view (D) showing a mode of coils and the second state of the coils in the fourth layer of the metallic thin film pattern in the multilayer printed board of FIG. 3 in the first example of the second embodiment.

That is, as shown in FIG. 15 (A) and FIG. 15 (D), magnetic fluxes S1 and S2 occur in outer legs 23A, 23B and middle leg 23C due to electric currents flowing in primary-side coils 21A and 21D in the first state (similar to that of the first embodiment), and electric current flows in secondary-side coil 22. At this time, electric current is going to flow in secondary-side coil 22 so as to cancel out magnetic fluxes S1 and S2 in FIGS. 15 (A) and (D) (such that magnetic fluxes S2 and S1 in the opposite directions occur). Referring to FIG. 16 (A) to (D), magnetic fluxes S1 and S2 occur in outer legs 23A, 23B and middle leg 23C due to electric currents flowing in primary-side coils 21B and 21C in the second state (similar to that of the first embodiment), and electric current flows in secondary-side coil 22. At this time, electric current is going to flow in secondary-side coil 22 so as to cancel out magnetic fluxes S1 and S2 in FIGS. 16 (A) and (D) (such that magnetic fluxes S2 and S1 in the opposite directions occur).

In this way, in the present embodiment, electric currents flowing simultaneously in primary-side coil 21 can flow in primary-side coils 21A and 21D which are arranged on layers different from each other (i.e., on different planes) and can flow in primary-side coils 21B and 21C which are arranged on layers different from each other (i.e., on different planes). In this regard, the present embodiment differs from the first embodiment in which electric currents flow simultaneously in primary-side coils 21A and 21D which are arranged on the same layer (on the same plane) and flow simultaneously in primary-side coils 21B and 21C which are arranged on the same layer (on the same plane).

This is based on the following reasons. In the present embodiment, primary-side coils 21A and 21B as the same layer are connected together by connecting portion 21E to become integral with each other. Similarly, primary-side coils 21C and 21D as the same layer are connected together by connecting portion 21F to become integral with each other.

The directions of electric currents from connecting portion 21E to primary-side coils 21A and 21B as the same layer can thereby be made identical (counterclockwise when seen from middle leg 23C in FIG. 15 (A)). Similarly, the directions of electric currents from connecting portion 21F to primary-side coils 21C and 21D as the same layer can be made identical (counterclockwise when seen from middle leg 23C in FIG. 15 (D)). According to this and the fact that only switching elements 11A and 11D are turned on in the first state as described in the first embodiment, electric currents in opposite directions to each other flow simultaneously in two primary-side coils which are not located on the same layer.

In this way, a plurality of (two) electric currents flowing simultaneously in parallel to each other in primary-side coils 21A to 21D only need to be opposite to each other, and do not need to flow in coils arranged on the same layer. It is sufficient that a plurality of electric currents in primary-side coils flow in opposite directions to each other, and they have a function of producing a turn of electric currents in a pseudo manner for stepping up as a transformer.

Since the remaining configuration of the present embodiment is almost the same as that of the first embodiment, the same reference characters are allotted to the same elements, and description thereof will not be repeated.

Next, the operation effects of the present embodiment will be described. In addition to the operation effects of the first embodiment, the present embodiment can produce the following operation effects.

Since primary-side coil 21 is formed of metal plates 29A and 29B in the present embodiment, the thickness becomes larger than in the case in which primary-side coil 21 is formed as a thin film pattern. It is therefore possible to increase the current-carrying cross section of primary-side coil 21 of the present embodiment. Accordingly, even if the output current of the insulation type step-up converter increases to increase electric currents in primary-side coil 21, the amount of heat generated by primary-side coil 21 can be reduced in the present embodiment.

Moreover, by integrating primary-side coils 21A and 21B by connecting portion 21E, manufacturing costs can be made lower than in the case in which they are separate members. The same also applies to primary-side coils 21C and 21D integrated by connecting portion 21F.

Regarding the present embodiment which enables reduction of heat generation as described above, the radiation path of the above-described step-up transformer will be described finally using FIG. 17.

Figure 17:
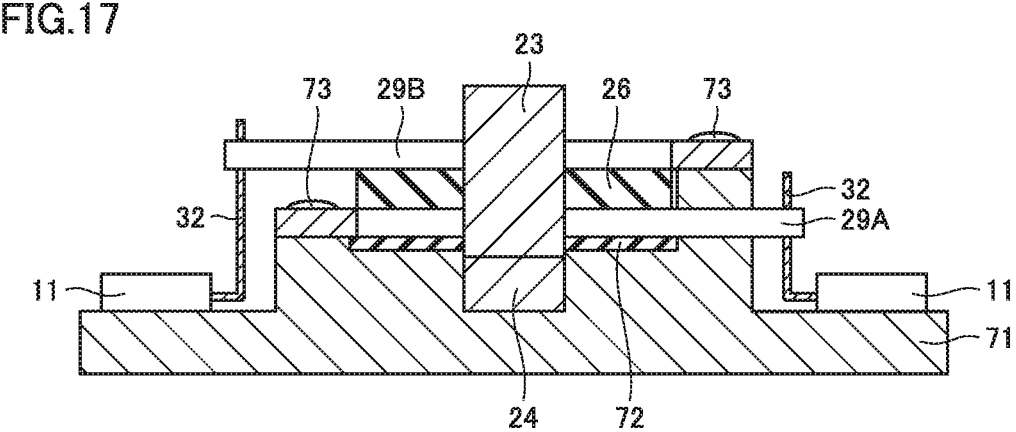
FIG. 17 is a schematic sectional view showing a mode in which a portion along the line XVII-XVII of FIG. 13 in the second embodiment has been assembled and set in a radiator.

Referring to FIG. 17, the step-up transformer after assembly at a portion along the line XVII-XVII of FIG. 13 is basically similar to the configuration of the first embodiment in FIG. 12, but differs in the following points.

Metal plates 29A and 29B as primary-side coil 21 are formed in multilayer printed board 26 including secondary-side coil 22 in the above-described mode. One end of a pair of ends of each of metal plates 29A and 29B as primary-side coil 21 (particularly, a through-hole leading to reference potential 7 shown in FIGS. 15 (A) and (D)) is preferably fixed to radiator 71 as reference potential 7 on the primary side with screws 73 (see FIG. 15 (A)). With these screws 73, metal plates 29A and 29B (multilayer printed board 26 including them) can be stably fixed to radiator 71, and heat generated by primary-side coil 21 can be easily transferred to radiator 71 through screws 73. Heat generated by primary-side coil 21 can also be transferred to radiator 71 through the contact surface between metal plate 29A (see FIG. 14) which is the lowermost layer of multilayer printed board 26 and radiator 71. Primary-side coil 21 and radiator 71 can also be electrically connected to each other with these screws 73 interposed therebetween, and primary-side coil 21 and radiator 71 can also be electrically connected to each other with the contact surface between metal plate 29A (see FIG. 14) which is the lowermost layer of multilayer printed board 26 and radiator 71 interposed therebetween.

Part of the surface of metal plate 29A leads to radiator 71 with insulating sheet 72 interposed therebetween. Heat generated by primary-side coil 21 (metal plate 29A) can also be easily transferred to radiator 71 along this path.

Summarizing the foregoing, a total of three heat transfer paths from primary-side coil 21 (metal plate 29A) of multilayer printed board 26 to radiator 71 exist (partly not shown). Specifically, the three paths include a path along which heat is directly transferred from primary-side coil 21 to radiator 71, a path along which heat is transferred from primary-side coil 21 to radiator 71 through screws 73 fixing primary-side coil 21 (with screws 73 interposed therebetween), and a path along which heat is transferred from primary-side coil 21 to radiator 71 through insulating sheet 72. Among them, the above-described first and second paths can also serve as paths of electric currents from primary-side coil 21 to radiator 71.

It is noted that the heat transfer paths from secondary-side coil 22 to radiator 71 are basically similar to those in FIG. 12 of the first embodiment, and description thereof will not be repeated here. Since the remaining configuration in FIG. 17 is basically similar to the radiation paths of the first embodiment in FIG. 12, description thereof will not be repeated here.

It is noted that the structural characteristics described in the respective embodiments (respective examples) described above can be combined appropriately within the range where technical inconsistency does not occur.

It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST 1 primary-side drive circuit; 2 step-up transformer; 3 rectifier circuit; 4 smoothing circuit; 5 control circuit; 6 DC power supply; 7 reference potential; 11, 11A, 11B, 11C, 11D, 11E, 11F, 11G, 11H switching element; 12, 13 node; 21, 21A, 21B, 21C, 21D primary-side coil; 21E, 21F connecting portion; 22 secondary-side coil; 23 E-shaped core; 23A, 23B outer leg; 23C middle leg; 23D core coupling part; 24 I-shaped core; 25 connection via; 26 multilayer printed board; 26A, 26B, 26C through-hole; 27 substrate body; 28, 28A, 28B, 28C, 28D pattern; 29A, 29B metal plate; 31, 31A, 31B, 31C, 31D rectifier element; 41 smoothing capacitor; 42 smoothing coil; 71 radiator; 72 insulating sheet; 73 screw; 74 housing; 101, 102, 301 insulation type step-up converter; S1, S2 magnetic flux.

The invention claimed is:

1. An insulation type step-up converter, comprising:
a core including a middle leg, a first outer leg spaced from the middle leg and arranged to extend in a direction identical to the middle leg, and a second outer leg spaced from the middle leg opposite to the first outer leg;
a first primary-side coil arranged between the first outer leg and the middle leg;
a second primary-side coil arranged between the second outer leg and the middle leg;
a secondary-side coil wound around the middle leg, overlapping at least part of each of the first and second primary-side coils, and spaced from the at least part of each of the first and second primary-side coils;
a third primary-side coil arranged between the first outer leg and the middle leg, overlapping at least part of the secondary-side coil, and spaced from each of the first primary-side coil and the secondary-side coil;
a fourth primary-side coil arranged between the second outer leg and the middle leg, overlapping at least part of the secondary-side coil, and spaced from each of the second primary-side coil and the secondary-side coil; and
a switching element configured such that it can be controlled to be on/off so as to cause electric currents in opposite directions to each other to flow simultaneously in the first and second primary-side coils, and configured such that it can be controlled to be on/off so as to cause electric currents in opposite directions to each other to flow simultaneously in the third and fourth primary-side coils, and configured such that it can be controlled to be on/off so as to cause electric currents to flow alternately in the first and second primary-side coils, and the third and fourth primary-side coils.

2. The insulation type step-up converter according to claim 1, wherein
the first and second primary-side coils are arranged on layers different from each other, and
the third and fourth primary-side coils are arranged on layers different from each other.

3. The insulation type step-up converter according to claim 1, wherein
the first, second, third, and fourth primary-side coils are formed of a metal plate,
the first and fourth primary-side coils are arranged on an identical layer, and the second and third primary-side coils are arranged on an identical layer, and
the first and fourth primary-side coils are connected to each other by a connecting portion formed of the metal plate, and the second and third primary-side coils are connected to each other by a connecting portion formed of the metal plate.

4. The insulation type step-up converter according to claim 1, wherein the first and second primary-side coils are arranged on a layer identical to each other, and the third and fourth primary-side coils are arranged on a layer identical to each other.

5. The insulation type step-up converter according to claim 2, wherein
- the first, second, third, and fourth primary-side coils are formed of a metal plate,
- the first and fourth primary-side coils are arranged on an identical layer, and the second and third primary-side coils are arranged on an identical layer, and
- the first and fourth primary-side coils are connected to each other by a connecting portion formed of the metal plate, and the second and third primary-side coils are connected to each other by a connecting portion formed of the metal plate.

6. The insulation type step-up converter according to claim 1, wherein
- each of the first, second, third, and fourth primary-side coils extends linearly in plan view.

7. The insulation type step-up converter according to claim 1, wherein
- one end of a pair of ends of each of the first, second, third, and fourth primary-side coils leads to one of a radiator or a housing as a reference potential.

8. The insulation type step-up converter according to claim 1, further comprising:
- a rectifier element configured to rectify a positive and negative voltage output from the secondary-side coil; and
- a smoothing circuit configured to smooth the voltage rectified by the rectifier element.

\* \* \* \* \*